United States Patent
Tiirola et al.

(10) Patent No.: US 11,991,673 B2
(45) Date of Patent: May 21, 2024

(54) APPARATUS, METHOD, AND COMPUTER PROGRAM

(71) Applicant: Nokia Solutions and Networks Oy, Espoo (FI)

(72) Inventors: Esa Tiirola, Kempele (FI); Keeth Saliya Jayasinghe Laddu, Espoo (FI); Ilkka Keskitalo, Oulu (FI); Juha Korhonen, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 440 days.

(21) Appl. No.: 17/415,662

(22) PCT Filed: Feb. 19, 2019

(86) PCT No.: PCT/EP2019/054127
§ 371 (c)(1),
(2) Date: Jun. 17, 2021

(87) PCT Pub. No.: WO2020/169185
PCT Pub. Date: Aug. 27, 2020

(65) Prior Publication Data
US 2022/0078788 A1 Mar. 10, 2022

(51) Int. Cl.
*H04W 4/00* (2018.01)
*H04W 72/0446* (2023.01)
(52) U.S. Cl.
CPC ................ *H04W 72/0446* (2013.01)

(58) Field of Classification Search
CPC ......... H04W 72/0446; H04W 28/0861; H04W 40/24; H04W 76/12; H04W 76/15; H04L 45/22
See application file for complete search history.

(56) References Cited

U.S. PATENT DOCUMENTS

| | | | | |
|---|---|---|---|---|
| 10,959,171 B2* | 3/2021 | Paredes Cabrera | ... | H04W 76/10 |
| 10,980,065 B2* | 4/2021 | Van Phan | ............ | H04W 76/15 |
| 2015/0223212 A1* | 8/2015 | Der Velde | ............ | H04W 76/15 |
| | | | | 370/329 |
| 2015/0223235 A1* | 8/2015 | Hwang | ............ | H04W 72/0446 |
| | | | | 370/329 |

(Continued)

OTHER PUBLICATIONS

"New SID Proposal: Study on Integrated Access and Backhaul for NR", 3GPP TSG RAN Meeting #78, RP-172290, Agenda : 9.3.6, AT&T, Dec. 18-21, 2017, 5 pages.

(Continued)

*Primary Examiner* — Stephen M D Agosta
(74) *Attorney, Agent, or Firm* — Lippes Mathias LLP

(57) ABSTRACT

An apparatus comprising: at least one processor; and at least one memory including computer program code; the at least one memory and the computer program code configured to, with the at least one processor, cause the apparatus at least to: receive (1302) a resource configuration for a first cell group link; receive (1304) a resource configuration for a second cell group link; determine (1306) a mode of operation; and determine a resource type for the first cell group link or the second cell group link based on the resource configuration for the first cell group link, the resource configuration for the second cell group link and the mode of operation.

17 Claims, 16 Drawing Sheets

(56) References Cited

U.S. PATENT DOCUMENTS

| | | | | |
|---|---|---|---|---|
| 2015/0327249 | A1* | 11/2015 | Kitazoe | H04W 52/50 370/329 |
| 2017/0064731 | A1* | 3/2017 | Wang | H04W 72/1263 |
| 2018/0092139 | A1* | 3/2018 | Novlan | H04W 8/005 |
| 2018/0192412 | A1* | 7/2018 | Novlan | H04W 76/10 |
| 2018/0192443 | A1* | 7/2018 | Novlan | H04W 76/15 |
| 2019/0053317 | A1* | 2/2019 | Hampel | H04W 28/082 |
| 2019/0110268 | A1* | 4/2019 | Abedini | H04W 72/56 |
| 2019/0132847 | A1* | 5/2019 | Abedini | H04W 52/38 |
| 2019/0141762 | A1* | 5/2019 | Novlan | H04B 7/15507 |
| 2019/0215055 | A1* | 7/2019 | Majmundar | H04W 40/04 |
| 2019/0253136 | A1* | 8/2019 | Makki | H04B 7/0617 |
| 2019/0349079 | A1* | 11/2019 | Novlan | H04B 7/15542 |
| 2020/0412414 | A1* | 12/2020 | Jones | H04B 7/2606 |

OTHER PUBLICATIONS

"3rd Generation Partnership Project; Technical Specification Group Radio Access Network; NR; Study on Integrated Access and Backhaul; (Release 16)", 3GPP TR 38.874, V16.0.0, Dec. 2018, pp. 1-111.

"New WID: Integrated Access and Backhaul for NR", 3GPP TSG RAN Meeting #82, RP-182882, Agenda : 9.1.2, Qualcomm, Dec. 10-13, 2018, 7 pages.

"New WID: Integrated Access and Backhaul for NR", 3GPP TSG RAN Meeting #82, RP-182322, Agenda : 9.1.2, Qualcomm, Dec. 10-13, 2018, 7 pages.

International Search Report and Written Opinion received for corresponding Patent Cooperation Treaty Application No. PCT/EP2019/054127, dated Oct. 24, 2019, 16 pages.

"Discussions on NR IAB Support", 3GPP TSG RAN WG1 Meeting #92bis, R1-1804583, Agenda : 7.7.1, LG Electronics, Apr. 16-20, 2018, pp. 1-9.

"Enhancements to Support NR Backhaul Links", 3GPP TSG RAN WG1 Meeting #95, R1-1812859, Agenda : 7 .2.3.1, AT&T, Oct. 8-12, 2018, 13 pages.

"Discussions on Mechanisms to Support N R IAB Scenarios", 3GPP TSG RAN WG1 Meeting #94bis, R1-1810273, Agenda : 7.2.3.3, LG Electronics, Oct. 8-12, 2018, 7 pages.

"Resource Coordination across IAB Topology", 3GPP TSG-RAN WG2 Meeting #101bis, R2-1804865, Agenda : 11.1, Qualcomm Incorporated, Apr. 16-20, 2018, 6 pages.

"Multi-connectivity Architecture Design for IAB Arch. 1a", 3GPP TSG-RAN WG3 Meeting #101, R3-185153, Agenda : 24.2, AT&T, Aug. 20-24, 2018, 17 pages.

* cited by examiner

| MCG MT | SCG MT | | |
| --- | --- | --- | --- |
| | DL | UL | Flex |
| DL | MCG -> DL | MCG -> DL | MCG -> DL |
| UL | MCG -> UL | MCG -> UL | MCG -> UL |
| Flex | SCG -> DL | SCG -> UL | MCG -> Flex |

Fig. 8

| MCG MT | SCG MT | | |
|---|---|---|---|
| | DL | UL | Flex |
| DL | Both -> DL | MCG -> DL | MCG -> DL |
| UL | MCG -> UL | Both -> UL | MCG -> UL |
| Flex | MCG -> Flex | MCG -> Flex | MCG -> Flex |

Fig. 9

| MCG MT | SCG MT | | |
| --- | --- | --- | --- |
| | DL | UL | Flex |
| DL | Both -> DL | MCG -> DL | MCG -> DL |
| UL | MCG -> UL | Both -> UL | MCG -> UL |
| Flex | SCG -> DL | SCG -> UL | MCG -> Flex |

Fig. 10

APPARATUS, METHOD, AND COMPUTER PROGRAM

RELATED APPLICATION

This application was originally filed as PCT Application No. PCT/EP2019/054127 on Feb. 19, 2019, each of which is incorporated herein by reference in its entirety.

FIELD OF THE DISCLOSURE

The present disclosure relates to an apparatus, a method, and a computer program for communicating over a master cell group link and/or a secondary cell group link by an integrated access and backhaul node.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet. In a wireless communication system at least a part of a communication session between at least two stations occurs over a wireless link.

A user can access the communication system by means of an appropriate communication device or terminal. A communication device of a user is often referred to as user equipment (UE) or user device. A communication device is provided with an appropriate signal receiving and transmitting apparatus for enabling communications, for example enabling access to a communication network or communications directly with other users. The communication device may access a carrier provided by a station or access point, and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture that is known as the long-term evolution (LTE) or the Universal Mobile Telecommunications System (UMTS) radio-access technology. Another example communication system is so called 5G radio or new radio (NR) access technology.

SUMMARY

According to an aspect there is provided an apparatus comprising at least one processor and at least one memory including computer code for one or more programs, the at least one memory and the computer code configured, with the at least one processor, to cause the apparatus at least to: receive a resource configuration for a first cell group link; receive a resource configuration for a second cell group link; determine a mode of operation; and determine a resource type for the first cell group link or the second cell group link based on the resource configuration for the first cell group link, the resource configuration for the second cell group link and the mode of operation.

The at least one memory and the computer program code may be configured to, with the at least one processor, cause the apparatus at least to: determine a resource type for the first cell group link and a resource type for the second cell group link based on the resource configuration for the first cell group link, the resource configuration for the second cell group link and the mode of operation.

The resource may be a time domain resource.

The resource configuration for the first cell group link may indicate a resource type.

The resource configuration for the second cell group link may indicate a resource type.

The resource type for the first cell group link or the second cell group link may be one of: 'downlink', 'uplink', 'flexible' or 'not available'.

The mode of operation may be time division duplexing between the first cell group link and the second cell group link.

The at least one memory and the computer program code may be configured to, with the at least one processor, cause the apparatus at least to: determine that the resource configuration for the first cell group link and the resource configuration for the second cell group link form a predefined combination; and determine that the resource type for the first cell group link is 'not available' and the resource type for the second cell group link is 'downlink', 'uplink' or 'flexible'.

The predefined combination may be one of: the resource configuration for the first cell group link is 'flexible' and the resource configuration for the second cell group link is 'downlink; or the resource configuration for the first cell group link is 'flexible' and the resource configuration for the second cell group link is 'uplink'.

The resource type for the second cell group link may be 'downlink' or 'uplink' based on the resource configuration of the second cell group link.

The at least one memory and the computer program code may be configured to, with the at least one processor, cause the apparatus at least to: determine that the resource configuration for the first cell group link and the resource configuration for the second cell group link form a predefined combination; and determine that the resource type for the first cell group link is 'downlink', 'uplink' or 'flexible' and the resource type for the second cell group link is 'resource not available'.

The predefined combination may be one of: the resource configuration for the first cell group link is 'downlink' and the resource configuration for the second cell group link is 'flexible'; or the resource configuration for the first cell group link is 'uplink' and the resource configuration for the second cell group link is 'flexible'.

The resource type for the first cell group link may be 'downlink' or 'uplink' based on the resource configuration of the first cell group link.

The mode of operation may be spatial division duplexing or frequency division duplexing between the first cell group link and the second cell group link.

The at least one memory and the computer program code may be configured to, with the at least one processor, cause the apparatus at least to: determine that the resource configuration for the first cell group link and the resource configuration for the second cell group link form a predefined combination; and determine that the resource type for the first cell group link is 'downlink', 'uplink' or 'flexible' and the resource type for the second cell group link is 'not available'.

The predefined combination may be one of: the resource configuration for the first cell group link is 'downlink' and the resource configuration for the second cell group link is 'flexible'; or the resource configuration for the first cell group link is 'uplink' and the resource configuration for the second cell group link is 'flexible'.

The resource type for the first cell group link may be 'downlink' or 'uplink' based on the resource configuration of the first cell group link.

The at least one memory and the computer program code may be configured to, with the at least one processor, cause the apparatus at least to: determine that the resource configuration for the first cell group link and the resource configuration for the second cell group link form a predefined combination; and determine that the resource type for the first cell group link is 'downlink', 'uplink' or 'flexible' and the resource type for the second cell group link is 'available'.

The predefined combination may be one of: the resource configuration for the first cell group link is 'downlink and the resource configuration for the second cell group link is 'downlink'; or the resource configuration for the first cell group link is 'uplink' and the resource configuration for the second cell group link is 'uplink'.

The resource type for the first cell group link may be 'downlink' or 'uplink' based on the resource configuration of the first cell group link and the resource type for the second cell group link may be 'downlink' or 'uplink' based on the resource configuration of the second cell group link.

The time domain resource may comprise a first frequency domain resource for the first cell group link and a second frequency domain resource for the second cell group link.

At least one of the resource configuration for the first cell group link and the resource configuration for the second cell group link may be a semi-static configuration.

The at least one memory and the computer program code may be configured to, with the at least one processor, cause the apparatus at least to: adjust the at least one of the resource type for the first cell group link and the resource type for the second cell group link based on a dynamic downlink control information.

One of the resource configuration for the first cell group link and the resource configuration for the second cell group link may be a semi-static configuration and the other one of the resource configuration for the first cell group link and the resource configuration for the second cell group link may be a dynamic configuration.

The apparatus may be an integrated access and backhaul node.

The apparatus may comprise a single mobile terminal part providing dual connectivity to two integrated access and backhaul parent nodes, wherein the first cell link is a master cell link and the second cell link is a secondary cell link; or two mobile terminal parts each providing single connectivity to a respective integrated access and backhaul parent node, wherein the first cell link is a master cell link and the second cell link is another master cell link.

The mode of operation may be determined based on an indication received from an integrated access and backhaul parent node or a centralized unit.

According to an aspect there is provided an apparatus comprising circuitry configured to: receive a resource configuration for a first cell group link; receive a resource configuration for a second cell group link; determine a mode of operation; and determine a resource type for the first cell group link or the second cell group link based on the resource configuration for the first cell group link, the resource configuration for the second cell group link and the mode of operation.

The circuitry may be configured to: determine a resource type for the first cell group link and a resource type for the second cell group link based on the resource configuration for the first cell group link, the resource configuration for the second cell group link and the mode of operation.

The resource may be a time domain resource.

The resource configuration for the first cell group link may indicate a resource type.

The resource configuration for the second cell group link may indicate a resource type. The resource type for the first cell group link or the second cell group link may be one of: 'downlink', 'uplink', 'flexible' or 'not available'.

The mode of operation may be time division duplexing between the first cell group link and the second cell group link.

The circuitry may be configured to: determine that the resource configuration for the first cell group link and the resource configuration for the second cell group link form a predefined combination; and determine that the resource type for the first cell group link is 'not available' and the resource type for the second cell group link is 'downlink', 'uplink' or 'flexible'.

The predefined combination may be one of: the resource configuration for the first cell group link is 'flexible' and the resource configuration for the second cell group link is 'downlink; or the resource configuration for the first cell group link is 'flexible' and the resource configuration for the second cell group link is 'uplink'.

The resource type for the second cell group link may be 'downlink' or 'uplink' based on the resource configuration of the second cell group link.

The circuitry may be configured to: determine that the resource configuration for the first cell group link and the resource configuration for the second cell group link form a predefined combination; and determine that the resource type for the first cell group link is 'downlink', 'uplink' or 'flexible' and the resource type for the second cell group link is 'resource not available'.

The predefined combination may be one of: the resource configuration for the first cell group link is 'downlink' and the resource configuration for the second cell group link is 'flexible'; or the resource configuration for the first cell group link is 'uplink' and the resource configuration for the second cell group link is 'flexible'.

The resource type for the first cell group link may be 'downlink' or 'uplink' based on the resource configuration of the first cell group link.

The mode of operation may be spatial division duplexing or frequency division duplexing between the first cell group link and the second cell group link.

The circuitry may be configured to: determine that the resource configuration for the first cell group link and the resource configuration for the second cell group link form a predefined combination; and determine that the resource type for the first cell group link is 'downlink', 'uplink' or 'flexible' and the resource type for the second cell group link is 'not available'.

The predefined combination may be one of: the resource configuration for the first cell group link is 'downlink' and the resource configuration for the second cell group link is 'flexible'; or the resource configuration for the first cell group link is 'uplink' and the resource configuration for the second cell group link is 'flexible'.

The resource type for the first cell group link may be 'downlink' or 'uplink' based on the resource configuration of the first cell group link.

The circuitry may be configured to: determine that the resource configuration for the first cell group link and the resource configuration for the second cell group link form a predefined combination; and determine that the resource type for the first cell group link is 'downlink', 'uplink' or 'flexible' and the resource type for the second cell group link is 'available'.

The predefined combination may be one of: the resource configuration for the first cell group link is 'downlink and the resource configuration for the second cell group link is 'downlink'; or the resource configuration for the first cell group link is 'uplink' and the resource configuration for the second cell group link is 'uplink'.

The resource type for the first cell group link may be 'downlink' or 'uplink' based on the resource configuration of the first cell group link and the resource type for the second cell group link may be 'downlink' or 'uplink' based on the resource configuration of the second cell group link.

The time domain resource may comprise a first frequency domain resource for the first cell group link and a second frequency domain resource for the second cell group link.

At least one of the resource configuration for the first cell group link and the resource configuration for the second cell group link may be a semi-static configuration.

The circuitry may be configured to: adjust the at least one of the resource type for the first cell group link and the resource type for the second cell group link based on a dynamic downlink control information.

One of the resource configuration for the first cell group link and the resource configuration for the second cell group link may be a semi-static configuration and the other one of the resource configuration for the first cell group link and the resource configuration for the second cell group link may be a dynamic configuration.

The apparatus may be an integrated access and backhaul node.

The apparatus may comprise a single mobile terminal part providing dual connectivity to two integrated access and backhaul parent nodes, wherein the first cell link is a master cell link and the second cell link is a secondary cell link; or two mobile terminal parts each providing single connectivity to a respective integrated access and backhaul parent node, wherein the first cell link is a master cell link and the second cell link is another master cell link.

The mode of operation may be determined based on an indication received from an integrated access and backhaul parent node or a centralized unit, According to an aspect there is provided an apparatus comprising means for: receiving a resource configuration for a first cell group link; receiving a resource configuration for a second cell group link; determining a mode of operation; and determining a resource type for the first cell group link or the second cell group link based on the resource configuration for the first cell group link, the resource configuration for the second cell group link and the mode of operation.

The apparatus may comprise means for: determining a resource type for the first cell group link and a resource type for the second cell group link based on the resource configuration for the first cell group link, the resource configuration for the second cell group link and the mode of operation.

The resource may be a time domain resource.

The resource configuration for the first cell group link may indicate a resource type.

The resource configuration for the second cell group link may indicate a resource type. The resource type for the first cell group link or the second cell group link may be one of: 'downlink', 'uplink', 'flexible' or 'not available'.

The mode of operation may be time division duplexing between the first cell group link and the second cell group link.

The apparatus may comprise means for: determining that the resource configuration for the first cell group link and the resource configuration for the second cell group link form a predefined combination; and determining that the resource type for the first cell group link is 'not available' and the resource type for the second cell group link is 'downlink', 'uplink' or 'flexible'.

The predefined combination may be one of: the resource configuration for the first cell group link is 'flexible' and the resource configuration for the second cell group link is 'downlink; or the resource configuration for the first cell group link is 'flexible' and the resource configuration for the second cell group link is 'uplink'.

The resource type for the second cell group link may be 'downlink' or 'uplink' based on the resource configuration of the second cell group link.

The apparatus may comprise means for: determining that the resource configuration for the first cell group link and the resource configuration for the second cell group link form a predefined combination; and determining that the resource type for the first cell group link is 'downlink', 'uplink' or 'flexible' and the resource type for the second cell group link is 'resource not available'.

The predefined combination may be one of: the resource configuration for the first cell group link is 'downlink' and the resource configuration for the second cell group link is 'flexible'; or the resource configuration for the first cell group link is 'uplink' and the resource configuration for the second cell group link is 'flexible'.

The resource type for the first cell group link may be 'downlink' or 'uplink' based on the resource configuration of the first cell group link.

The mode of operation may be spatial division duplexing or frequency division duplexing between the first cell group link and the second cell group link.

The apparatus may comprise means for: determining that the resource configuration for the first cell group link and the resource configuration for the second cell group link form a predefined combination; and determining that the resource type for the first cell group link is 'downlink', 'uplink' or 'flexible' and the resource type for the second cell group link is 'not available'.

The predefined combination may be one of: the resource configuration for the first cell group link is 'downlink' and the resource configuration for the second cell group link is 'flexible'; or the resource configuration for the first cell group link is 'uplink' and the resource configuration for the second cell group link is 'flexible'.

The resource type for the first cell group link may be 'downlink' or 'uplink' based on the resource configuration of the first cell group link.

The apparatus may comprise means for: determining that the resource configuration for the first cell group link and the resource configuration for the second cell group link form a predefined combination; and determining that the resource type for the first cell group link is 'downlink', 'uplink' or 'flexible' and the resource type for the second cell group link is 'available'.

The predefined combination may be one of: the resource configuration for the first cell group link is 'downlink and the resource configuration for the second cell group link is 'downlink'; or the resource configuration for the first cell group link is 'uplink' and the resource configuration for the second cell group link is 'uplink'.

The resource type for the first cell group link may be 'downlink' or 'uplink' based on the resource configuration of the first cell group link and the resource type for the second cell group link may be 'downlink' or 'uplink' based on the resource configuration of the second cell group link.

The time domain resource may comprise a first frequency domain resource for the first cell group link and a second frequency domain resource for the second cell group link.

At least one of the resource configuration for the first cell group link and the resource configuration for the second cell group link may be a semi-static configuration.

The apparatus may comprise means for: adjusting the at least one of the resource type for the first cell group link and the resource type for the second cell group link based on a dynamic downlink control information.

One of the resource configuration for the first cell group link and the resource configuration for the second cell group link may be a semi-static configuration and the other one of the resource configuration for the first cell group link and the resource configuration for the second cell group link may be a dynamic configuration.

The apparatus may be an integrated access and backhaul node.

The apparatus may comprise a single mobile terminal part providing dual connectivity to two integrated access and backhaul parent nodes, wherein the first cell link is a master cell link and the second cell link is a secondary cell link; or two mobile terminal parts each providing single connectivity to a respective integrated access and backhaul parent node, wherein the first cell link is a master cell link and the second cell link is another master cell link.

The mode of operation may be determined based on an indication received from an integrated access and backhaul parent node or a centralized unit.

According to an aspect there is provided a method comprising: receiving a resource configuration for a first cell group link; receiving a resource configuration for a second cell group link; determining a mode of operation; and determining a resource type for the first cell group link or the second cell group link based on the resource configuration for the first cell group link, the resource configuration for the second cell group link and the mode of operation.

The method may comprise: determining a resource type for the first cell group link and a resource type for the second cell group link based on the resource configuration for the first cell group link, the resource configuration for the second cell group link and the mode of operation.

The resource may be a time domain resource.

The resource configuration for the first cell group link may indicate a resource type.

The resource configuration for the second cell group link may indicate a resource type.

The resource type for the first cell group link or the second cell group link may be one of: 'downlink', 'uplink', 'flexible' or 'not available'.

The mode of operation may be time division duplexing between the first cell group link and the second cell group link.

The method may comprise: determining that the resource configuration for the first cell group link and the resource configuration for the second cell group link form a predefined combination; and determining that the resource type for the first cell group link is 'not available' and the resource type for the second cell group link is 'downlink', 'uplink' or 'flexible'.

The predefined combination may be one of: the resource configuration for the first cell group link is 'flexible' and the resource configuration for the second cell group link is 'downlink; or the resource configuration for the first cell group link is 'flexible' and the resource configuration for the second cell group link is 'uplink'.

The resource type for the second cell group link may be 'downlink' or 'uplink' based on the resource configuration of the second cell group link.

The method may comprise: determining that the resource configuration for the first cell group link and the resource configuration for the second cell group link form a predefined combination; and determining that the resource type for the first cell group link is 'downlink', 'uplink' or 'flexible' and the resource type for the second cell group link is 'resource not available'.

The predefined combination may be one of: the resource configuration for the first cell group link is 'downlink' and the resource configuration for the second cell group link is 'flexible'; or the resource configuration for the first cell group link is 'uplink' and the resource configuration for the second cell group link is 'flexible'.

The resource type for the first cell group link may be 'downlink' or 'uplink' based on the resource configuration of the first cell group link.

The mode of operation may be spatial division duplexing or frequency division duplexing between the first cell group link and the second cell group link.

The method may comprise: determining that the resource configuration for the first cell group link and the resource configuration for the second cell group link form a predefined combination; and determining that the resource type for the first cell group link is 'downlink', 'uplink' or 'flexible' and the resource type for the second cell group link is 'not available'.

The predefined combination may be one of: the resource configuration for the first cell group link is 'downlink' and the resource configuration for the second cell group link is 'flexible'; or the resource configuration for the first cell group link is 'uplink' and the resource configuration for the second cell group link is 'flexible'.

The resource type for the first cell group link may be 'downlink' or 'uplink' based on the resource configuration of the first cell group link.

The method may comprise: determining that the resource configuration for the first cell group link and the resource configuration for the second cell group link form a predefined combination; and determining that the resource type for the first cell group link is 'downlink', 'uplink' or 'flexible' and the resource type for the second cell group link is 'available'.

The predefined combination may be one of: the resource configuration for the first cell group link is 'downlink and the resource configuration for the second cell group link is 'downlink'; or the resource configuration for the first cell group link is 'uplink' and the resource configuration for the second cell group link is 'uplink'.

The resource type for the first cell group link may be 'downlink' or 'uplink' based on the resource configuration of the first cell group link and the resource type for the second cell group link may be 'downlink' or 'uplink' based on the resource configuration of the second cell group link.

The time domain resource may comprise a first frequency domain resource for the first cell group link and a second frequency domain resource for the second cell group link.

At least one of the resource configuration for the first cell group link and the resource configuration for the second cell group link may be a semi-static configuration.

The method may comprise: adjusting the at least one of the resource type for the first cell group link and the resource type for the second cell group link based on a dynamic downlink control information.

One of the resource configuration for the first cell group link and the resource configuration for the second cell group link may be a semi-static configuration and the other one of the resource configuration for the first cell group link and the resource configuration for the second cell group link may be a dynamic configuration.

The method may be performed by an integrated access and backhaul node.

The method may be performed by an apparatus comprising a single mobile terminal part providing dual connectivity to two integrated access and backhaul parent nodes, wherein the first cell link is a master cell link and the second cell link is a secondary cell link; or two mobile terminal parts each providing single connectivity to a respective integrated access and backhaul parent node, wherein the first cell link is a master cell link and the second cell link is another master cell link.

The mode of operation may be determined based on an indication received from an integrated access and backhaul parent node or a centralized unit.

According to an aspect there is provided a computer program comprising computer executable code which when run on at least one processor is configured to: receive a resource configuration for a first cell group link; receive a resource configuration for a second cell group link; determine a mode of operation; and determine a resource type for the first cell group link or the second cell group link based on the resource configuration for the first cell group link, the resource configuration for the second cell group link and the mode of operation.

The computer program may comprise computer executable code which when run on at least one processor is configured to: determine a resource type for the first cell group link and a resource type for the second cell group link based on the resource configuration for the first cell group link, the resource configuration for the second cell group link and the mode of operation.

The resource may be a time domain resource.

The resource configuration for the first cell group link may indicate a resource type.

The resource configuration for the second cell group link may indicate a resource type.

The resource type for the first cell group link or the second cell group link may be one of: 'downlink', 'uplink', 'flexible' or 'not available'.

The mode of operation may be time division duplexing between the first cell group link and the second cell group link.

The computer program may comprise computer executable code which when run on at least one processor is configured to: determine that the resource configuration for the first cell group link and the resource configuration for the second cell group link form a predefined combination; and determine that the resource type for the first cell group link is 'not available' and the resource type for the second cell group link is 'downlink', 'uplink' or 'flexible'.

The predefined combination may be one of: the resource configuration for the first cell group link is 'flexible' and the resource configuration for the second cell group link is 'downlink; or the resource configuration for the first cell group link is 'flexible' and the resource configuration for the second cell group link is 'uplink'.

The resource type for the second cell group link may be 'downlink' or 'uplink' based on the resource configuration of the second cell group link.

The computer program may comprise computer executable code which when run on at least one processor is configured to: determine that the resource configuration for the first cell group link and the resource configuration for the second cell group link form a predefined combination; and determine that the resource type for the first cell group link is 'downlink', 'uplink' or 'flexible' and the resource type for the second cell group link is 'resource not available'.

The predefined combination may be one of: the resource configuration for the first cell group link is 'downlink' and the resource configuration for the second cell group link is 'flexible'; or the resource configuration for the first cell group link is 'uplink' and the resource configuration for the second cell group link is 'flexible'.

The resource type for the first cell group link may be 'downlink' or 'uplink' based on the resource configuration of the first cell group link.

The mode of operation may be spatial division duplexing or frequency division duplexing between the first cell group link and the second cell group link.

The computer program may comprise computer executable code which when run on at least one processor is configured to: determine that the resource configuration for the first cell group link and the resource configuration for the second cell group link form a predefined combination; and determine that the resource type for the first cell group link is 'downlink', 'uplink' or 'flexible' and the resource type for the second cell group link is 'not available'.

The predefined combination may be one of: the resource configuration for the first cell group link is 'downlink' and the resource configuration for the second cell group link is 'flexible'; or the resource configuration for the first cell group link is 'uplink' and the resource configuration for the second cell group link is 'flexible'.

The resource type for the first cell group link may be 'downlink' or 'uplink' based on the resource configuration of the first cell group link.

The computer program may comprise computer executable code which when run on at least one processor is configured to: determine that the resource configuration for the first cell group link and the resource configuration for the second cell group link form a predefined combination; and determine that the resource type for the first cell group link is 'downlink', 'uplink' or 'flexible' and the resource type for the second cell group link is 'available'.

The predefined combination may be one of: the resource configuration for the first cell group link is 'downlink and the resource configuration for the second cell group link is 'downlink'; or the resource configuration for the first cell group link is 'uplink' and the resource configuration for the second cell group link is 'uplink'.

The resource type for the first cell group link may be 'downlink' or 'uplink' based on the resource configuration of the first cell group link and the resource type for the second cell group link may be 'downlink' or 'uplink' based on the resource configuration of the second cell group link.

The time domain resource may comprise a first frequency domain resource for the first cell group link and a second frequency domain resource for the second cell group link.

At least one of the resource configuration for the first cell group link and the resource configuration for the second cell group link may be a semi-static configuration.

The computer program may comprise computer executable code which when run on at least one processor is configured to: adjust the at least one of the resource type for the first cell group link and the resource type for the second cell group link based on a dynamic downlink control information.

One of the resource configuration for the first cell group link and the resource configuration for the second cell group link may be a semi-static configuration and the other one of the resource configuration for the first cell group link and the resource configuration for the second cell group link may be a dynamic configuration.

The mode of operation may be determined based on an indication received from an integrated access and backhaul parent node or a centralized unit.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

List of Abbreviations
   AF: Application Function
   AUSF: Authentication Server Function
   AMF: Access Management Function
   BH: Backhaul
   CP: Control Plane
   CU: Centralized Unit
   DC: Dual Connectivity
   DCI: Downlink Control Information
   DL: Downlink
   DU: Distributed Unit
   FDM: Frequency Division Multiplexing
   F: Flexible
   GNB: gNodeB
   GPRS: General Packet Radio Services
   GSM: Global System for Mobile communication
   GTP: GPRS Tunnelling Protocol
   IAB: Integrated Access and Backhaul
   IP: Internet Protocol
   LTE: Long Term Evolution
   L1: Layer 1
   L2: Layer 2
   NEF: Network Exposure Function
   NR: New Radio
   MAC: Medium Access Control
   MCG: Master Cell Group
   MN: Master Node
   MS: Mobile Station
   MT: Mobile Terminal
   MTC: Machine Type Communication
   NA: Not Available
   NR: New Radio
   NG: Next Generation
   NGC: Next Generation Core Network
   PDCP: Packet Data Convergence Protocol
   PHY: Physical
   RAM: Random Access Memory
   RAN: Radio Access Network
   RLC: Radio Link Control
   RLF: Radio Link Failure
   ROM: Read Only Memory
   s RRC: Radio Resource Control
   SC: Single Connectivity
   SCG: Secondary Cell Group
   SDM: Space Division Multiplexing
   SMF: Session Management Function
   SN: Secondary Node
   TDD: Time Division Duplex
   TDM: Time Division Multiplexing
   UDM: User Data Management
   UDP: User Data Protocol
   UE: User Equipment
   UL: Uplink
   UMTS: Universal Mobile Telecommunication System
   UP: User Plane
   UPF: User Plane Function
   USB: Universal Serial Bus
   WI: Work Item
   WID: Work Item Description
   3GPP: $3^{rd}$ Generation Partnership Project
   5G: $5^{th}$ Generation
   5GC: 5G Core network
   5GS: 5G System
   -U: User plane
   -C: Control plane

BRIEF DESCRIPTION OF THE FIGURES

Embodiments will now be described, by way of example only, with reference to the accompanying Figures in which:

FIG. 8 shows a table for enabling an integrated access and backhaul node to determine a resource type for a master cell group link and/or a secondary cell group link when the master cell group link and the secondary cell group link are time division multiplexed;

FIG. 9 shows a table for enabling an integrated access and backhaul node to determine a resource type for a master cell group link and/or a secondary cell group link when the master cell group link and the secondary cell group link are space division multiplexed or frequency division multiplexed;

FIG. 10 shows an alternative table for enabling an integrated access and backhaul node to determine a resource type for a master cell group link and/or a secondary cell group link when the master cell group link and the secondary cell group link are space division multiplexed or frequency division multiplexed;

DETAILED DESCRIPTION OF THE FIGURES

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1 to 3 to assist in understanding the technology underlying the described examples.

Figure 1:
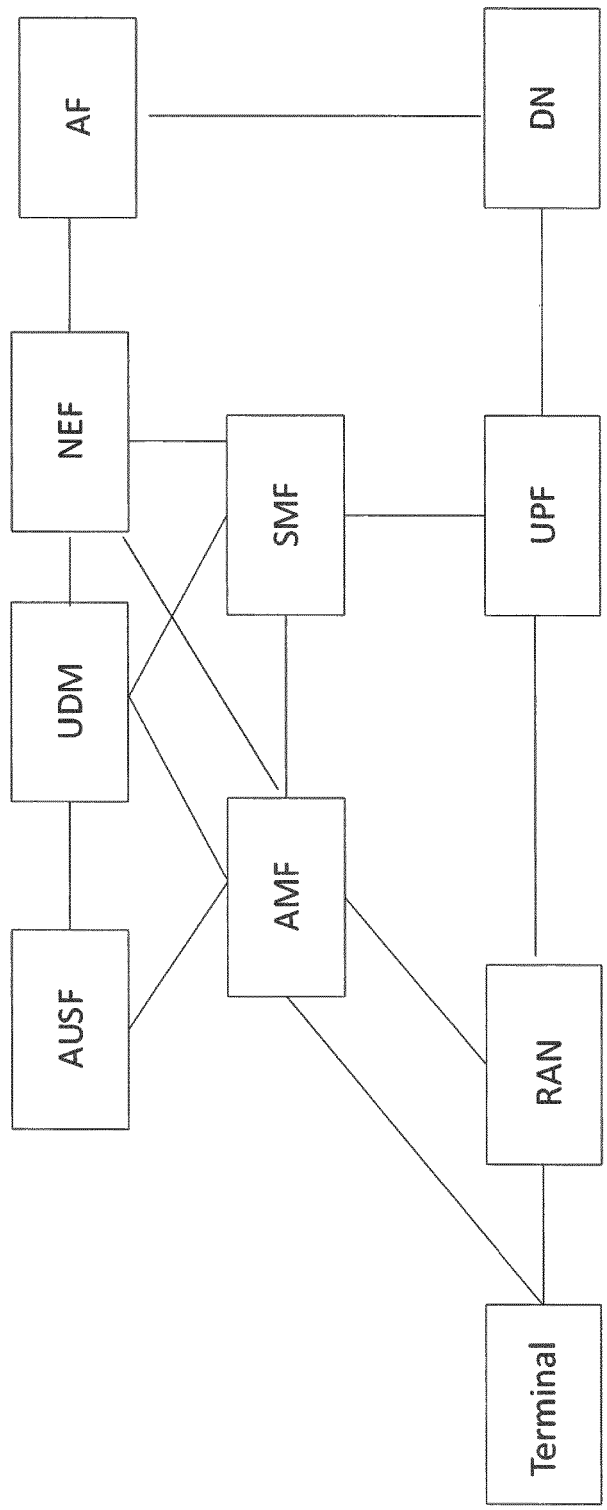
FIG. 1 shows a schematic representation of a 5G system.

FIG. 1 shows a schematic representation of a 5G system (5GS). The 5GS may comprises a terminal, a 5G radio access network (5G RAN), a 5G core network (5GC), one or more application function (AF) and one or more data networks (DN).

The 5G RAN may comprise one or more gNodeB (GNB) distributed unit (DU) functions connected to one or more gNodeB (GNB) centralized unit (CU) functions.

The 5GC may comprise an access management function (AMF), a session management function (SMF), an authentication server function (AUSF), a user data management (UDM), a user plane function (UPF) and/or a network exposure function (NEF).

Figure 2:
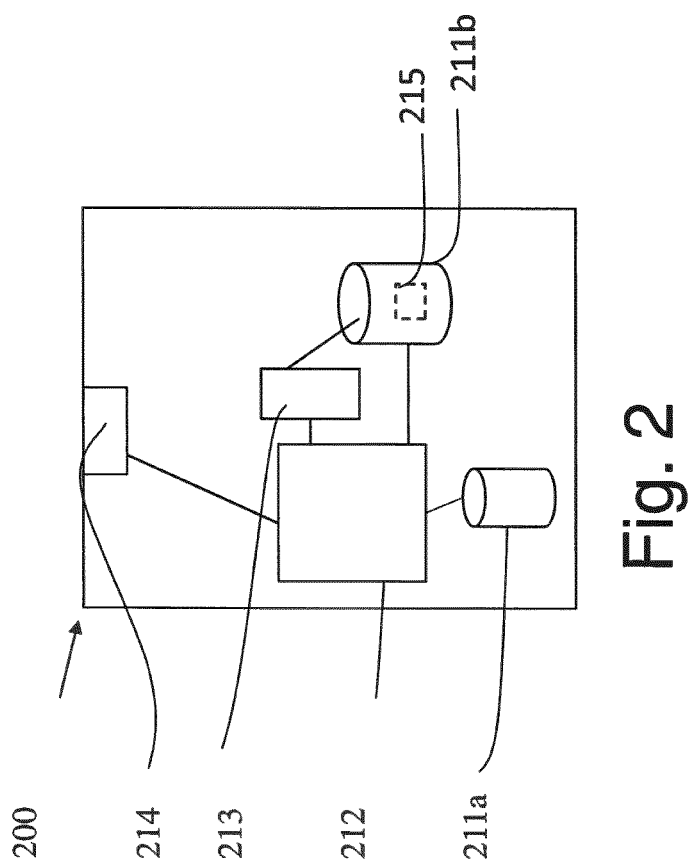
FIG. 2 shows a schematic representation of a control apparatus.

FIG. 2 illustrates an example of a control apparatus 200 for controlling a function, such as a function of the 5G RAN or the 5GC as illustrated on FIG. 1. The control apparatus may comprise at least one random access memory (RAM) 211a, at least on read only memory (ROM) 211b, at least one processor 212, 213 and an input/output interface 214. The at least one processor 212, 213 may be coupled to the RAM 211a and the ROM 211b. Via the input/output interface 214 may be coupled to other components of the function of the 5G RAN or the 5GC. The at least one processor 212, 213 may be configured to execute an appropriate software code 215. The software code 215 may for example allow to perform one or more steps to perform one or more of the following aspects. The software code 215 may be stored in the ROM 211b. The control apparatus 200 may be interconnected with another control apparatus 200 controlling another function of the 5G RAN or of the 5GC. In some embodiments, each function of the 5G RAN or the 5GC comprises a control apparatus 200. In alternative embodiments, two or more function of the 5G RAN or the 5GC may share a control apparatus.

Figure 3:
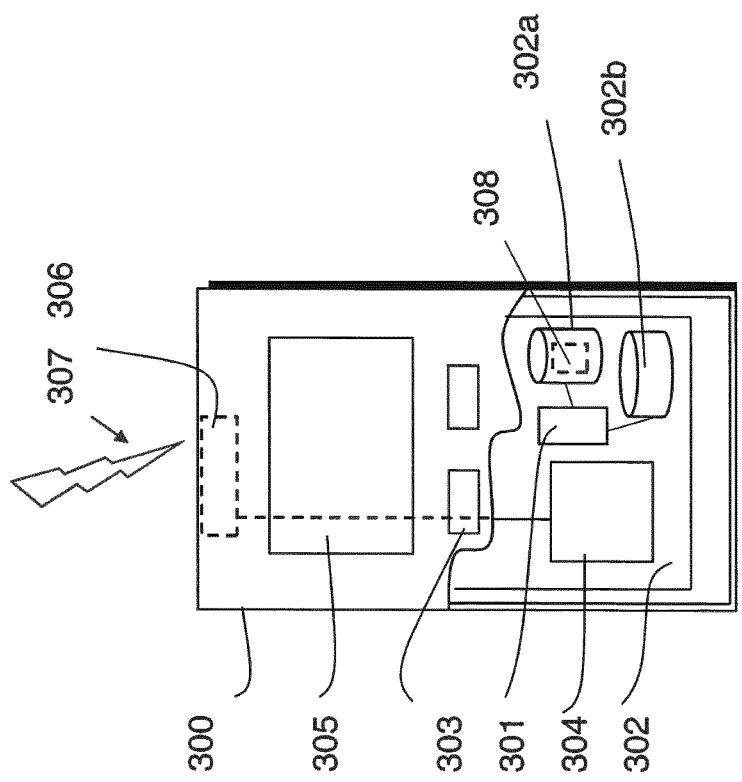
FIG. 3 shows a schematic representation of a terminal.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, an Internet of things (IoT) type communication device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 211a and the ROM 211b. The at least one processor 301 may be configured to execute an appropriate software code 308. The software code 308 may for example allow to perform one or more of the following aspects. The software code 308 may be stored in the ROM 211b The processor, storage and other relevant control apparatus can be provided on an appropriate circuit board and/or in chipsets. This feature is denoted by reference 304.

The device may optionally have a user interface such as key pad 305, touch sensitive screen or pad, combinations thereof or the like. Optionally one or more of a display, a speaker and a microphone may be provided depending on the type of the device.

One or more of the following aspects relate to integrated access and backhaul (IAB). More specifically, one or more of the following aspects relate to resource type determination in the case of IAB node in dual connectivity (DC) with an IAB parent node via a master cell group (MCG) link and another IAB parent node via a secondary cell group (SCG) link.

3GPP study item related to IAB (RP-172290, "Study on Integrated Access and Backhaul for NR", AT&T, Qualcomm, Samsung) was finalized and the study item outcome was captured in TR 38.874. In RAN #82 meeting, IAB work item was approved in RP-182882 and it is expected to discuss multi-connectivity to support the route redundancy and route selection. The exact text in the work item description (WID) is as follows:

"Specification of IAB-node migration underneath the same IAB-donor (with or without a change of IAB-donor [distributed unit (DU)], and between different IAB-donors. Migration of IAB-node could be network-controlled or could be due to [backhaul (BH)][radio link failure (RLF)].

Support for route redundancy and route selection based on multi-connectivity (e.g. TB 38.874 clause 9.7, leveraging existing NB solutions as well as NR-NR DC, without additional RAN1 work. (see NOTE1)".

The objectives related to the radio resource allocation under responsibility of RAN1 were defined as follows:

"Specification of mechanisms for resource multiplexing among backhaul and access links. This includes:

"Specification of semi-static configuration for IAB-node/ IAB-donor DU resources in case of TDM operation subject to half-duplex constraint. This shall be forward compatible to allow the support of half-duplex scenarios with [frequency division multiplexing (FDM)] and [space division multiplexing (SDM)] resource sharing among backhaul and access links.

Specification of time resource types for the DU's child links: [downlink (DL)] hard, DL soft, [uplink (UL)] hard, UL soft, Flexible hard, Flexible soft, Not Available.

Specification of dynamic indication (L1 signalling) of the availability of soft resources for a child IAB-node DU.

Specification of required transmission/reception rules for IAB-nodes and associated behaviours regarding time resource utilization as discussed in TB 38.874 clause 7.3.3".

NR may allow network deployment with minimized manual efforts and/or as automated self-configuration as possible. Especially on higher frequency bands the coverage may be problematic and specific capabilities may be needed for NR to enable effortless coverage extensions with minimized (or no) requirements for network (re-)planning in a fast and cost-effective manner. For these reasons, 3GPP is specifying an IAB solution with capabilities enabling wireless backhauling for NR sites that do not have fixed (e.g. wired or fibre) connection to the core network. Using radio connection for backhauling may eliminate the need for cabling of all sites (which can be very dense) which may dramatically reduce the initial deployment costs.

Furthermore, an intention may be to use the same carrier for both backhaul and access links sharing the same radio resources and, in some cases, also radio transceivers. Frequency bands especially applicable for IAB may be those having sufficient capacity (i.e. large enough carrier bandwidths). These carriers may be on mmWave bands which typically are unpaired time division duplexing (TDD) bands (a.k.a. unpaired bands). Therefore, the IAB may consider a half-duplex constraint (i.e. no simultaneous transmission and reception to avoid excessive interference between transmitter and receiver).

Yet another requirement for IAB may be the support for multi-hop relaying where an IAB node may provide wireless BH link for the next hop IAB node. The serving IAB node providing the BH connection may be called an IAB parent node. An IAB parent node may either be an IAB donor node (with wired connection to the core network) or another IAB node. The served IAB node may be called a child IAB node. In DC scenario there may be two IAB parent nodes. An IAB parent node may be a master node (MN). Another IAB parent node may be a secondary node (SN).

Figure 4:
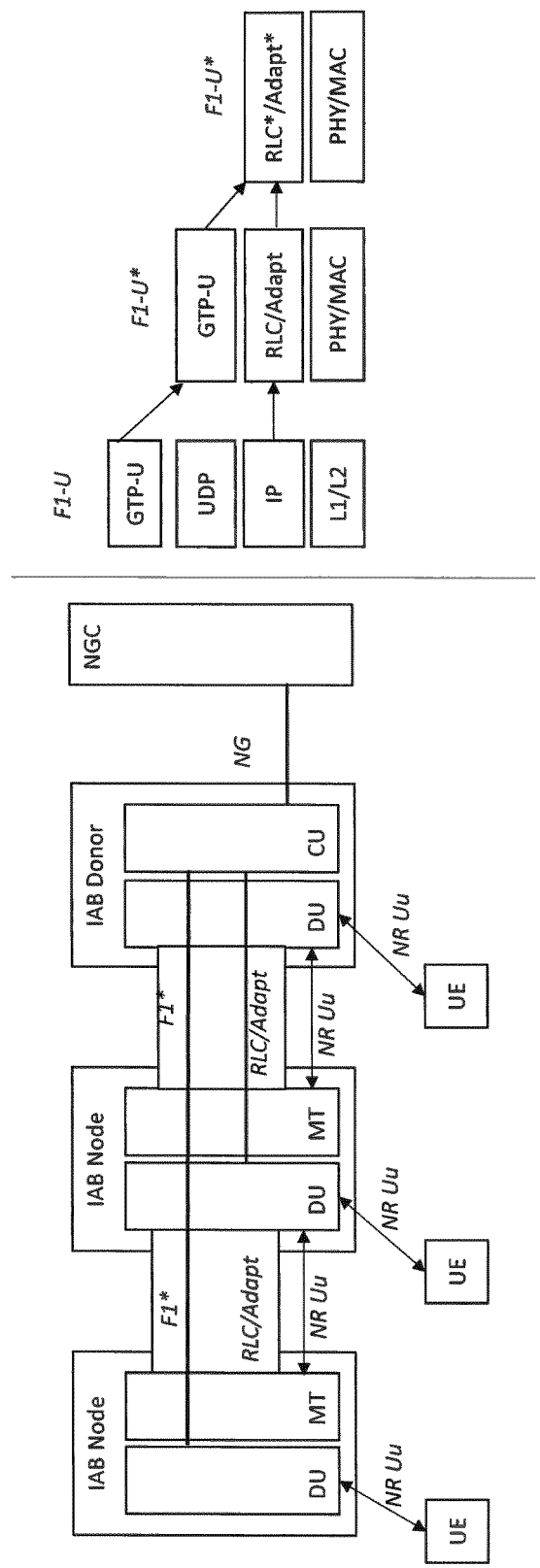
FIG. 4 shows a schematic representation of an integrated access and backhaul node connected to an integrated access and backhaul donor node through another integrated access and backhaul node.

There are different options for the IAB architecture. FIG. 4 shows a high-level architecture for layer 2 (L2) relaying with distributed base station, i.e. gNB, architecture which has been adopted as the basis for normative work in the IAB Work Item (WI)RP-182882.

The architecture comprises an IAB donor node and IAB nodes. The IAB donor node may comprise a CU part and a DU part. The IAB nodes may comprise a DU part and a mobile terminal (MT) part. Via the MT part, the IAB nodes may connect to an upstream IAB node or the IAB donor node. Via the DU part, the IAB nodes may connect to UEs and to MT parts of downstream IAB nodes.

The IAB donor node may host the CU for all IAB nodes. That is, the IAB donor node may run radio resource control (RRC), higher L2 (e.g. packet data convergence (PDCP)) and/or control functions for the subtending IAB topology. DUs may reside at the IAB nodes hosting the lower L2 protocol layers (RLC, MAC) and the physical (PHY) layer. The CU may have two control interfaces to the IAB nodes, namely RRC connection to the IAB-MT and F1-C to the IAB-DU. Hence both RRC signalling and F1-AP may be available for the IAB configuration and control. With this architecture the radio resources usage may have central coordination by the donor CU.

TR 38874 (clause 7.3.3) refers to resource coordination as follows: "From an IAB-node MT point-of-view, as in Rel. 15, the following time-domain resources can be indicated for the parent link:

Downlink time resource;
Uplink time resource;
Flexible time resource.

From an IAB-node DU point-of-view, the child link has the following types of time resources:

Downlink time resource;
Uplink time resource;
Flexible time resource;
Notavailable time resources (resources not to be used for communication on the DU child links).

Each of the downlink, uplink and flexible time-resource types of the DU child link can belong to one of two categories:

Hard: The corresponding time resource is always available for the DU child link;
Soft: The availability of the corresponding time resource for the DU child link is explicitly and/or implicitly controlled by the parent node.
[ . . . ]

In order to support mechanisms for resource allocation for IAB-nodes, semi-static configuration is supported for the configuration of IAB-node DU resources. In addition, dynamic indication (L1 signalling) to an IAB-node of the availability of soft resources for an IAB-node DU is supported. Existing Rel. 15 L1 signalling methods as the baseline, while potential enhancements (e.g. new slot formats), rules for DU/MT behaviour in case of conflicts across multiple hops, and processing time constraints at the IAB-node may need to be considered.

Tables 7.3.3-1 and 7.3.3-2 capture the possible combinations of DU and MT behavior. The tables assume an IAB not capable of full-duplex operation. In the tables below the following definitions apply:

- "MT: Tx" means that the MT should transmit if scheduled;
- "DU: Tx" means that the DU may transmit;
- "MT: Rx" means that the MT should be able to receive (if there is anything to receive);
- "DU: Rx" means that the DU may schedule uplink transmissions from child nodes or UEs;
- "MT: T/Rx" means that the MT should transmit if scheduled and should be able to receive, but not simultaneously;
- "DU: Tx/Rx" means that the DU may transmit and may schedule uplink transmission from child nodes and UEs, but not simultaneously;
- "IA" means that the DU resource is explicitly or implicitly indicated as available;
- "INA" means that the DU resource is explicitly or implicitly indicated as not available;
- "MT: NULL" means that the MT does not transmit and does not have to be able to receive;
- "DU: NULL" means that the DU does not transmit and does not schedule uplink transmission from child nodes and UEs.

Table 7.3.3-1 applies in case of [time division multiplexing (TDM)] operation, where there can be no simultaneous transmission in the DU and the MT, nor any simultaneous reception in the DU and the MT.

TABLE 7.3.3-1

DU and MT behavior in case of TDM operation

| DU Configuration | MT configuration | | |
|---|---|---|---|
| | DL | UL | F |
| DL-H | DU: Tx<br>MT: NULL | DU: Tx<br>MT: NULL | DU: Tx<br>MT: NULL |
| DL-S | When DU resource: IA<br>DU: Tx<br>MT: NULL<br>When DU resource: INA<br>DU: NULL<br>MT: Rx | When DU resource: IA<br>DU: Tx<br>MT: NULL<br>When DU resource: INA<br>DU: NULL<br>MT: Tx | When DU resource: IA<br>DU: Tx<br>MT: NULL<br>When DU resource: INA<br>DU: NULL<br>MT: Tx/Rx |
| UL-H | DU: Rx<br>MT: NULL | DU: RX<br>MT: NULL | DU: Rx<br>MT: NULL |
| UL-S | When DU resource: IA<br>DU: Rx<br>MT: NULL<br>When DU resource: INA<br>DU: NULL<br>MT: Rx | When DU resource: IA<br>DU: Rx<br>MT: NULL<br>When DU resource: INA<br>DU: NULL<br>MT: Tx | When DU resource: IA<br>DU: Rx<br>MT: NULL<br>When DU resource: INA<br>DU: NULL<br>MT: Tx/Rx |
| F-H | DU: Tx/Rx<br>MT: NULL | DU: Tx/Rx<br>MT: NULL | DU: Tx/Rx<br>MT: NULL |
| F-S | When DU resource: IA<br>DU: Tx/Rx<br>MT: NULL<br>When DU resource: INA<br>DU: NULL<br>MT: Rx | When DU resource: IA<br>DU: Tx/Rx<br>MT: NULL<br>When DU resource: INA<br>DU: NULL<br>MT: Tx | When DU resource: IA<br>DU: Tx/Rx<br>MT: NULL<br>When DU resource: INA<br>DU: NULL<br>MT: Tx/Rx |
| NA | DU: NULL<br>MT: Rx | DU: NULL<br>MT: Tx | DU: NULL<br>MT: Tx/Rx |

Table 7.3.3-2 applies in case of space division multiplexing (SDM) operation, where there can be simultaneous transmission in the DU and the MT, alternatively simultaneous reception in the DU and the MT.

TABLE 7.3.3-2

DU and MT behaviour in case of SDM operation

| | DL | UL | F |
|---|---|---|---|
| DL-H | DU: Tx<br>MT: NULL | DU: Tx<br>MT: Tx | DU: Tx<br>MT: Tx |
| DL-S | When DU resource: IA<br>DU: Tx<br>MT: NULL<br>When DU resource: INA<br>DU: NULL<br>MT: Rx | When DU resource: IA<br>DU: TX<br>MT: Tx<br>When DU resource: INA<br>DU: NULL<br>MT: Tx | When DU resource: IA<br>DU: Tx<br>MT: Tx<br>When DU resource: INA<br>DU: NULL<br>MT: Tx/Rx |
| UL-H | DU: Rx<br>MT: Rx | DU: Rx<br>MT: NULL | DU: Rx<br>MT: Rx |
| UL-S | When DU resource: IA<br>DU: Rx<br>MT: Rx | When DU resource: IA<br>DU: Rx<br>MT: NULL | When DU resource: IA<br>DU: Rx (only if MT is Rx and the DU knows that |

TABLE 7.3.3-2-continued

DU and MT behaviour in case of SDM operation

| | DL | UL | F |
|---|---|---|---|
| | When DU resource: INA<br>DU: NULL<br>MT: Rx | When DU resource: INA<br>DU: NULL<br>MT: Tx | ahead of time)<br>MT: Rx<br>When DU resource: INA<br>DU: NULL<br>MT: Tx/Rx |
| F-H | DU: Tx/Rx<br>MT: Rx (only if DU is<br>Rx and the parent DU is<br>aware in advance) | DU: Tx/Rx<br>MT: Tx (only if DU is<br>Tx and the parent is<br>aware in advance) | DU: Tx/Rx<br>MT: Tx (only if DU is Tx and<br>the parent DU knows that<br>ahead of time), Rx (only if<br>DU is Rx and the parent DU<br>is aware in advance) |
| F-S | When DU resource: IA<br>DU: Tx/Rx<br>MT: Rx<br>(only if DU is<br>Rx and the parent DU<br>is aware in advance)<br>When DU resource: INA<br>DU: NULL<br>MT: Rx | When DU resource: IA<br>DU: Tx/Rx<br>MT: Tx (only if DU is<br>Tx and the parent DU is<br>aware in advance)<br>When DU resource: INA<br>DU: NULL<br>MT: Tx | When DU resource: IA<br>DU: Tx/Rx<br>MT: Tx (only if DU is Tx and<br>the parent DU knows that<br>ahead of time), Rx (only if<br>DU is Rx and the parent DU<br>is aware in advance)<br>When DU resource: INA<br>DU: NULL<br>MT: Tx/Rx |
| NA | DU: NULL<br>MT: Rx | DU: NULL<br>MT: Tx | DU: NULL<br>MT: Tx/Rx |

".

Figure 5A:
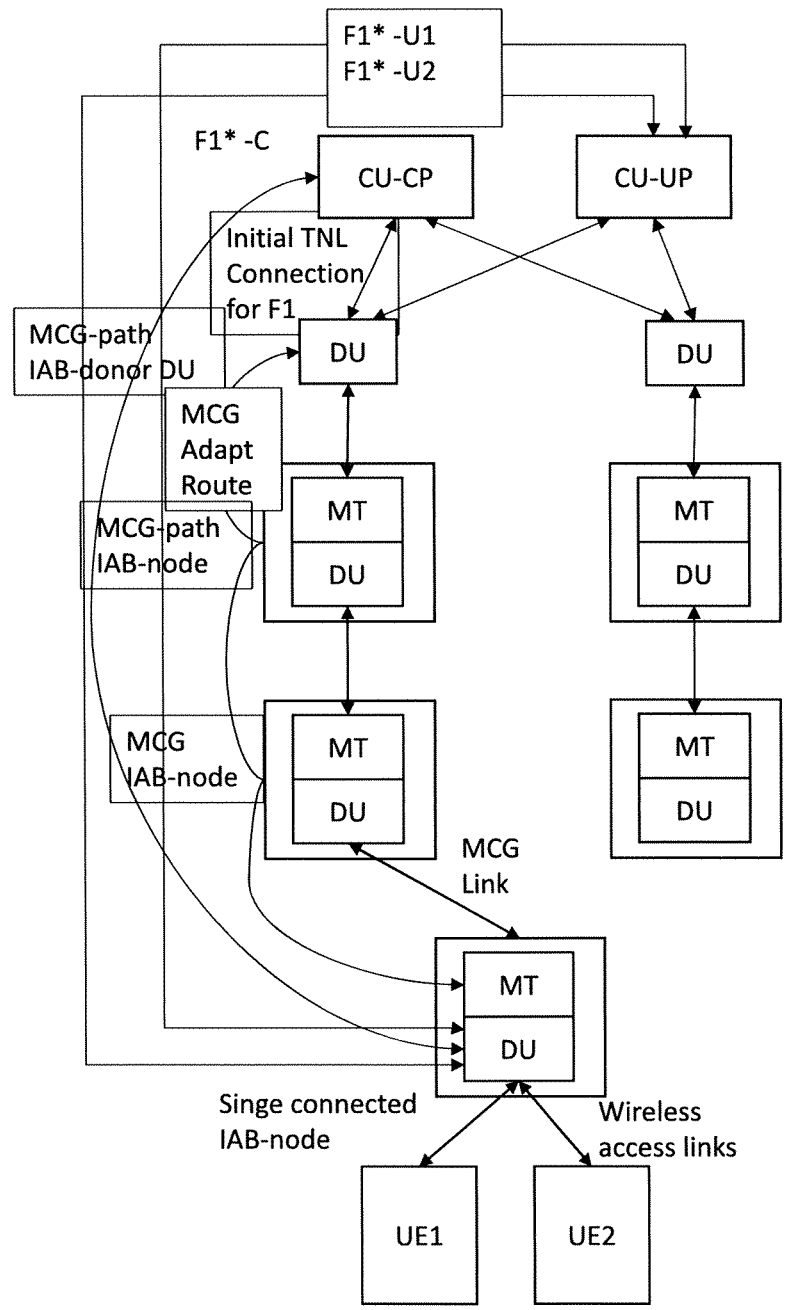
FIG. 5a shows a schematic representation of an integrated access and backhaul node connected to an integrated access and backhaul donor node in a single connectivity scenario.

FIG. 5a shows a schematic representation of IAB node connected to an IAB donor node in a single connectivity (SC) scenario. In the single connectivity scenario, the M par of the IAB node may be connected to IAB door node DU via an MCG IAB parent node.

Figure 5B:
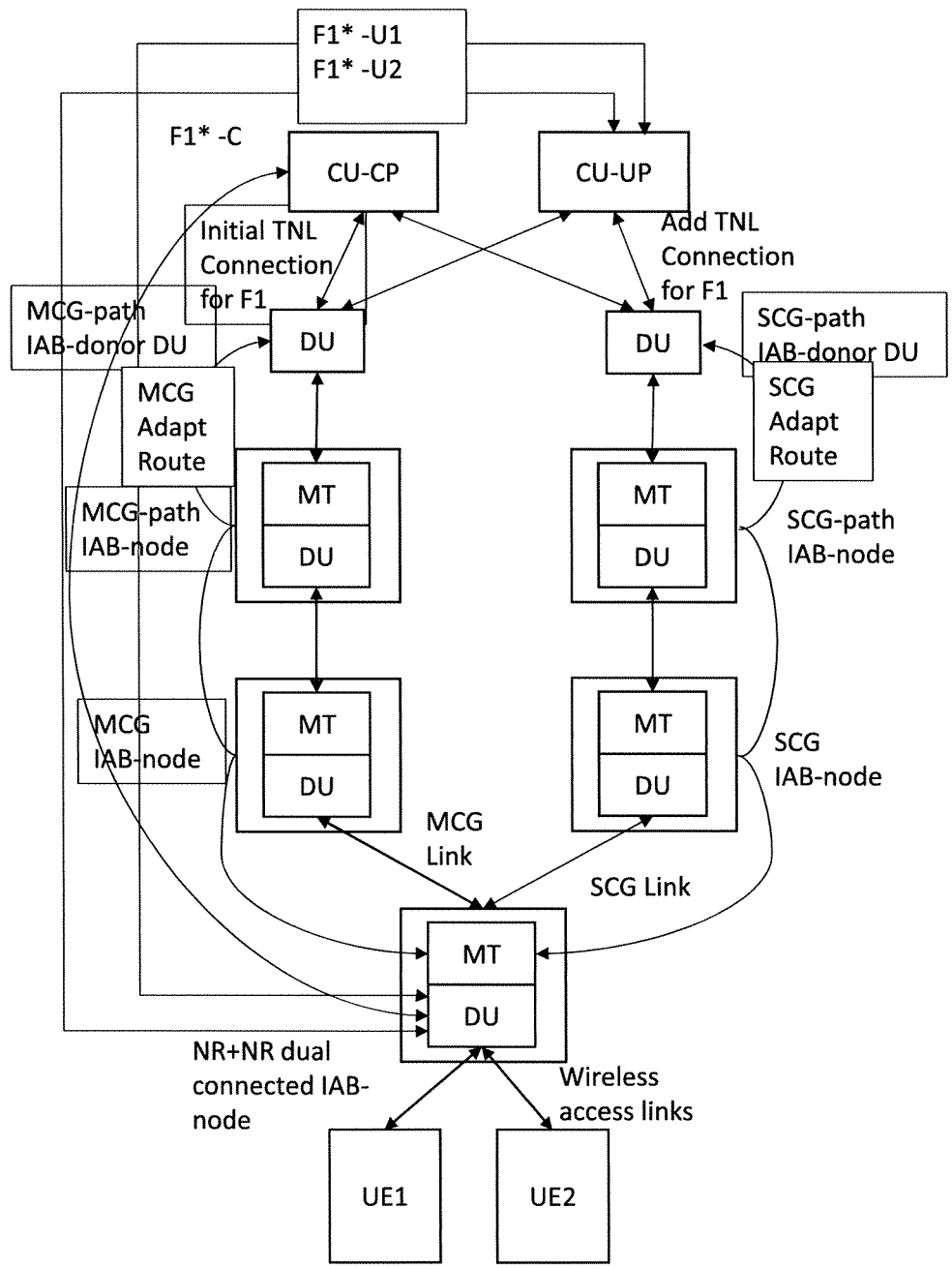
FIG. 5b shows a schematic representation of an integrated access and backhaul node connected to integrated access and backhaul donor node in a dual connectivity scenario.

FIG. 5b shows a schematic representation of IAB node connected to IAB donor nodes in a DC scenario. In the DC scenario, the MT part of the IAB node may be connected to an IAB donor node via an MCG IAB parent node and via a SCG IAB parent node.

DC may enable topological redundancy by providing an alternative link and/or a redundant route to the IAB donor node. This may improve the reliability and robustness for potential link failures.

In an in-band IAB scenario both MCG and SCG parent links between the IAB node and the MCG and SCG parent nodes may operate on the same carrier (i.e. intra-frequency dual connectivity). Also, the child links between the IAB node and user equipment may operate on the same carrier. The IAB node may be limited with the half-duplex constraint where the transmission and reception cannot happen at the same time instant.

The IAB node may be a dual-MT IAB node and comprise two (logical) MT part, each having a separate single connectivity to the IAB parent nodes. However, it will be understood that from a resource usage perspective, there may be no difference to DC with a single MT. One or more of the following aspect relate to the single MT case but the principles are similarly applicable for dual-MT case except that there may be two MCGs configured instead of MCG and SCG. There may also be differences in operation and control on higher layers.

Figure 6:
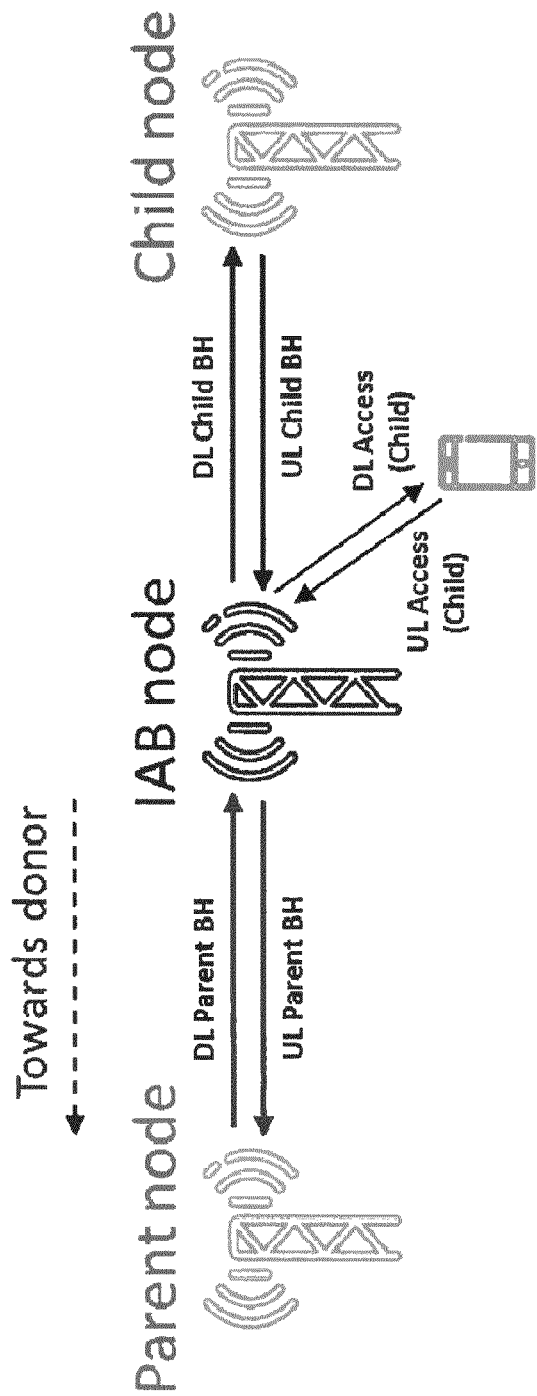
FIG. 6 shows a schematic representation of an integrated access and backhaul node connected to an integrated access and backhaul parent node and an integrated access and backhaul child node.

FIG. 6 shows basic connections between the IAB nodes and access UEs. From the middle IAB node perspective, there will be parent BH links as well as child BH and access links, all for both UL and/or DL.

As discussed above the IAB node may contain two separate parts: a MT part, which may facilitate parent BH connections between IAB parent nodes and the IAB node; and a DU part, which may facilitate child BH connections between the IAB node and IAB child nodes and/or between the IAB node and UEs (connected to the IAB node via Access link).

Resource configuration may be made by means of separate configurations: separately for DU and MT parts of the IAB node and/or separately for each IAB node.

Resource configuration for an MCG link and an SCG link may be made by means of separate configurations: one resource configuration for the MCG link and another resource configuration for the SCG link A challenge may be to ensure that IAB node connected to two IAB parent nodes (e.g. one via an MCG link and another via a SCG link) has a consistent resource configuration for two backhaul links such that: IAB capabilities may be maximally reused, resource conflict due to IAB capability and/or link direction conflict may be avoided, there are sufficient means for CU to adjust/adapt the resources available for the MCG link and the SCG link and/or signalling complexity may be minimized.

It should be noted that in the case of DC, connection between the involved DUs may not be available, or if it is available it may be delayed and may have limited capacity. Furthermore, involved DUs may be able to operate separately with minimum amount of coordination.

Dual connectivity for UEs is not supported for intra-band scenario in NR Rel-5 (DC is supported only for inter-band scenario, where UE configuration can be fully independent between different cells).

One or more of the following aspects relate to the issue of operating an IAB node in the DC scenario where MT resources of the IAB node are configured separately for (at least) two parent nodes, MCG and (at least one) SCG. Two (or ore) parent nodes may operate under the same CU or two (or more) parent node may operate under different CUs.

Figure 7:
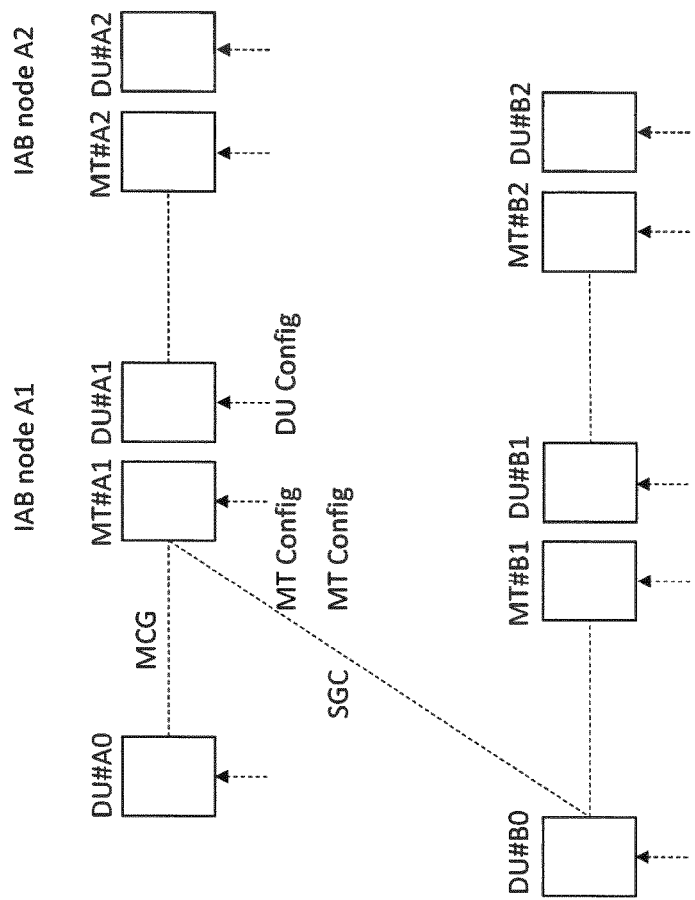
FIG. 7 shows a schematic representation of an integrated access and backhaul node connected to integrated access and backhaul parent nodes and an integrated access and backhaul child node in a dual connectivity scenario.

An example of the considered scenario is shown in FIG. 7. The MCG link and the SCG link may be operating at the same frequency band (TDD) or on separate frequency bands.

One or more of the following aspects propose to determine a MT resource type for a MCG link and/or a MT resource type for a SCG link for a time domain resource based on one or more of the following parameters:
- MT resource configuration corresponding to the MCG link: UL, DL or Flexible;
- MT resource configuration corresponding to the SCG link: UL, DL or Flexible; and
- Duplexing configuration between the MCG link and the SCG link: TDM vs. SDM/FDM.

Depending on the duplexing configuration, the MT resource type may be one of the following:
- TDM between the MCG link and the SCG link: MCG link available only or SCG link available only; and
- SDM/FDM the MCG link and the SCG link: MCG link and SCG link both available, MCG link available only or SCG link available only.

When operating according to TDM between the MCG link and the SCG link, at least one predefined resource configuration combination (MT resource configuration corresponding to the MCG link and MT resource configuration corresponding to the SCG link) may indicate that the MT resource type is available (i.e. reserved) for the SCG link (and not available for the MCG link). FIG. 8 shows an example of a table according to this aspect:
- MCG link Flexible and SCG link DL: SCG link DL;
- MCG link Flexible and SCG link UL: SCG link UL; and
- Other combinations: MCG link according to MCG link configuration.

More specifically, when the MT configuration of the MCG link is DL and the MT configuration of the SCG link is DL, the MT resource type of the MCG link may be DL and the MT resource type of the SCG may be not available (NA).

When the MT configuration of the MCG link is DL and the MT configuration of the SCG link is UL, the MT resource type of the MC link may be DL and the MT resource type of the SCG may be NA.

When the MT configuration of the MCG link is DL and the MT configuration of the SCG link is flexible, the MT resource type of the MCG link may be DL and the MT resource type of the SCG may be NA.

When the MT configuration of the MCG link is UL and the MT configuration of the SCG link is DL, the MT resource type of the MCG link may be UL and the MT resource type of the SCG may be NA.

When the MT configuration of the MCG link is UL and the MT configuration of the SCG link is UL, the MT resource type of the MCG link may be UL and the MT resource type of the SCG may be NA.

When the MT configuration of the MCG link is UL and the MT configuration of the SCG link is flexible, the MT resource type of the MCG link may be UL and the MT resource type of the SCG may be NA.

When the MT configuration of the MCG link is flexible and the MT configuration of the SCG link is DL, the MT resource type of the MCG link may be NA and the MT resource type of the SCG may be DL.

When the MT configuration of the MCG link is flexible and the MT configuration of the SCG link is UL, the MT resource type of the MCG link may be NA and the MT resource type of the SCG may be UL.

When the MT configuration of the MCG link is flexible and the MT configuration of the SCG link is flexible, the MT resource type of the MCG link may be NA and the MT resource type of the SCG may be NA.

It should be noted that this mode of operation (i.e. TDM between MCG and SCG) can be made available also when IAB node supports FDM or SDM between the MCG link and the SCG link.

When operating according to FDM or SDM between the MCG link and the SCG link, at least one predefined resource configuration combination (MT resource configuration corresponding to the MCG link and MT resource configuration corresponding to the SCG link) may indicate that the MT resource type is available (i.e. reserved) for both the SCG link and the MCG link. FIG. 9 shows an example of a table according to this aspect:
- MCG link DL and SCG link DL: MCG link and SCG link DL;
- MCG link UL and SCG link UL: MCG link and SCG link UL; and
- Other combinations: MCG link according to MCG link configuration.

More specifically, when the MT configuration of the MCG link is DL and the MT configuration of the SCG link is DL, the MT resource type of the MCG link may be DL and the MT resource type of the SCG may be DL.

When the MT configuration of the MCG link is DL and the MT configuration of the SCG link is UL, the MT resource type of the MCG link may be DL and the MT resource type of the SCG may be NA.

When the MT configuration of the MCG link is DL and the MT configuration of the SCG link is flexible, the MT resource type of the MCG link may be DL and the MT resource type of the SCG may be NA.

When the MT configuration of the MCG link is UL and the MT configuration of the SCG link is DL, the MT resource type of the MCG link may be UL and the MT resource type of the SCG may be NA.

When the MT configuration of the MCG link is UL and the MT configuration of the SCG link is UL, the MT resource type of the MCG link may be UL and the MT resource type of the SCG may be UL.

When the MT configuration of the MCG link is UL and the MT configuration of the SCG link is flexible, the MT resource type of the MCG link may be UL and the MT resource type of the SCG may be NA.

When the MT configuration of the MCG link is flexible and the MT configuration of the SCG link is DL, the MT resource type of the MCG link may be flexible and the MT resource type of the SCG may be NA.

When the MT configuration of the MCG link is flexible and the MT configuration of the SCG link is UL, the MT resource type of the MCG link may be flexible and the MT resource type of the SCG may be NA.

When the MT configuration of the MCG link is flexible and the MT configuration of the SCG link is flexible, the MT resource type of the MCG link may be flexible and the MT resource type of the SCG may be NA.

In one implementation, at least one predefined resource configuration combination (MT resource configuration corresponding to the MCG link and MT resource configuration corresponding to the SCG link may indicate that the MT resource type is available (i.e. reserved) for the SCG link also in the FDM or SDM scenario. FIG. 10 shows an example of a table according to this aspect:
- MCG link Flex and SCG link DL: SCG link DL; and
- MCG link Flex and SCG link UL: SCG link UL.

When the MT configuration of the MCG link is DL and the MT configuration of the SCG link is DL, the MT resource type of the MCG link may be DL and the MT resource type of the SCG may be DL.

When the MT configuration of the MCG link is DL and the MT configuration of the SCG link is UL, the MT resource type of the MCG link may be DL and the MT resource type of the SCG may be NA.

When the MT configuration of the MCG link is DL and the MT configuration of the SCG link is flexible, the MT resource type of the MCG link may be DL and the MT resource type of the SCG may be NA.

When the MT configuration of the MCG link is UL and the MT configuration of the SCG link is DL, the MT resource type of the MCG link may be UL and the MT resource type of the SCG may be NA.

When the MT configuration of the MCG link is UL and the MT configuration of the SCG link is UL, the MT resource type of the MCG link may be UL and the MT resource type of the SCG may be UL.

When the MT configuration of the MCG link is UL and the MT configuration of the SCG link is flexible, the MT resource type of the MCG link may be UL and the MT resource type of the SCG may be NA.

When the MT configuration of the MCG link is flexible and the MT configuration of the SCG link is DL, the MT resource type of the MCG link may be NA and the MT resource type of the SCG may be DL.

When the MT configuration of the MCG link is flexible and the MT configuration of the SCG link is UL, the MT resource type of the MCG link may be NA and the MT resource type of the SCG may be UL.

When the MT configuration of the MCG link is flexible and the MT configuration of the SCG link is flexible, the MT resource type of the MCG link may be flexible and the MT resource type of the SCG may be NA.

The duplexing operation may be determined based on indication received from CU or IAB parent node. It may depend also on the IAB capability (e.g. based on such as number of antenna panels, baseband processing capability).

The starting point for resource configuration is such that resources may be given as semi-static configuration by CU. The main purpose of SCG link may be to provide redundant link for the case when the quality of the MCG link fails. The redundant link may be utilized for topological robustness to cope with the failure scenarios providing alternative route if either one of the links fail. The other usage may be to balance the load between the BH links as the traffic load varies.

IAB parent node may be able to dynamically adapt the MT resources based on DCI Format 2_0 or based on other DCIs such has dedicated DCI (e.g. DL resource allocation grant, or UL resource allocation grant). If the link having dynamic configuration is the SCG link, this may allow the SCG to use more resources to handle sudden variation of the SCG link's quality.

If even more scheduling opportunities through the SCG link is wanted, the roles of the MCG link and the SCG link may be swapped. For example, if the MCG link fails completely, the SCG link resources may be used to perform the swapping.

When a time resource is configured as "Flexible" by semi-static configuration at an IAB node, an IAB parent node may re-configure it as "DL" or "UL" by dynamic configuration (e.g. DCI 2_0). Separate DCI 2_0 nay be defined for both the MCG link and the SCG link. Dynamic DCI indicated via DCI Format 2_0 nay override semi-static resource configuration for the involved link (MCG link or SCG link). This provides, for example, possibilities for increasing and/or decreasing the SCG resources dynamically by the scheduling node (via rules discussed above).

For example, an SCG link flexible time resource may be turned to DL or UL by DCI format 2_0. The corresponding time resources may become available for the SCG link, provided that the MCG link is flexible.

In one implementation, only one IAB parent node may use dynamic configurations and the other IAB parent node may use a semi-static configuration. When the MCG link (or SCG link) is having dynamic configuration and the SCG link (or MCG link) is having a semi-static configuration, the rules discussed above may still hold. Using this approach, the IAB parent node may temporarily pull some time resources from the SCG link to the MCG link (or vice versa).

It will be understood that for semi-static resource configuration, MT resources for the IAB node may be configured by the CU (e.g. via RRC signalling), separately for the MCG link and the SCG link. The CU may also perform DU configuration, separately for the MCG link and the SCG link.

For DCI 2_0, the CU may configure DCI 2_0 separately for the MCG link and the SCG link. The DU part of the IAB node may need to be configured accordingly.

Figure 11:
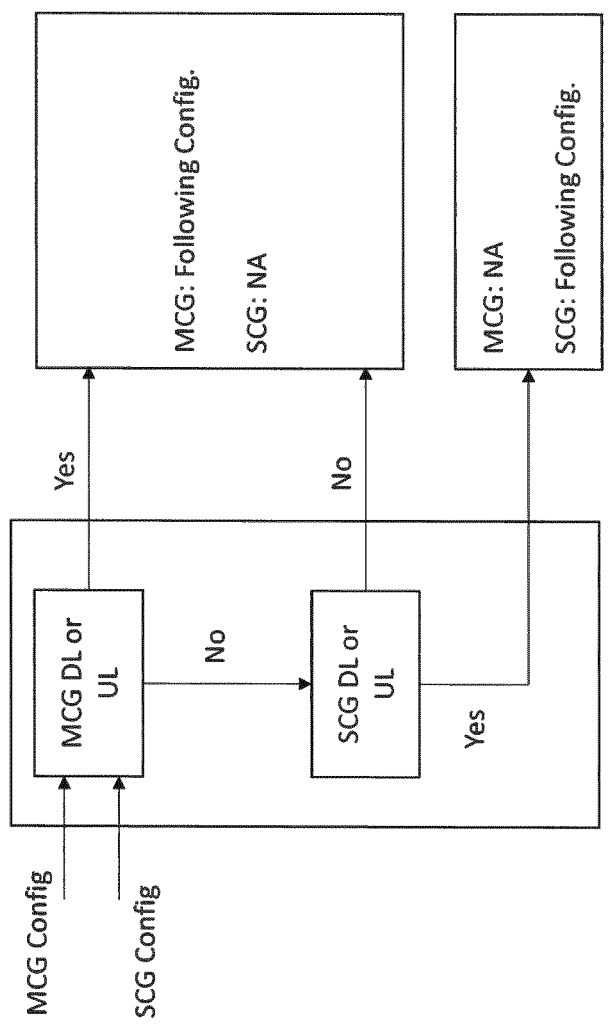
FIG. 11 shows a block diagram of a method for enabling an integrated access and backhaul node to determine a resource type for a master cell group link and/or a secondary cell group link when the master cell group link and the secondary cell group link are time division multiplexed.

FIG. 11 shows an example of how to determine MT resource type for an MCG link and an SCG link with given MCG link and SCG link configurations in the case of TDM between the MCG link and the SCG link. This follows operation according to the table of FIG. 8.

Figure 12:
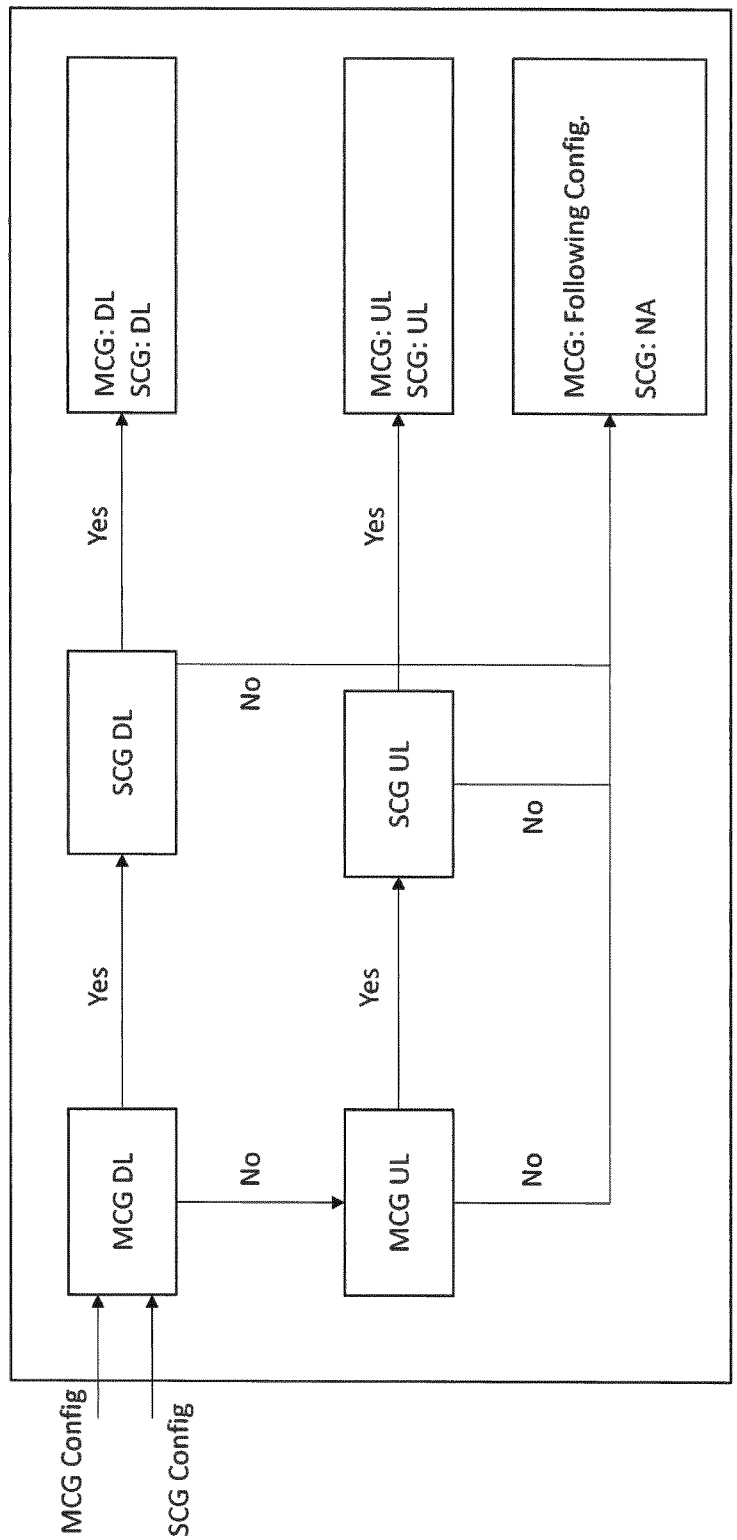
FIG. 12 shows a block diagram of a method for enabling an integrated access and backhaul node to determine a resource type for a master cell group link and/or a secondary cell group link when the master cell group link and the secondary cell group link are space division multiplexed or frequency division multiplexed.

FIG. 12 shows an example of how to determine MT resource type for an MCG link and an SCG link with given MCG link and SCG link configurations in the case of SDM or FDM between the MCG link and the SCG link. This follows operation according to the table of FIG. 9.

The proposed principle may be applied in scenarios with multiple SCG links if such extension is specified in future releases of NR. For example, the following operation can be defined for the TDM duplexing scenario: the CU may play with configuration (only the configuration of a selected SCG link is DL or UL, other are Flex); there may be a predefined priority order between the SCG links (e.g. according to an SCG link index). Only the one with the highest priority may be selected.

Figure 13:
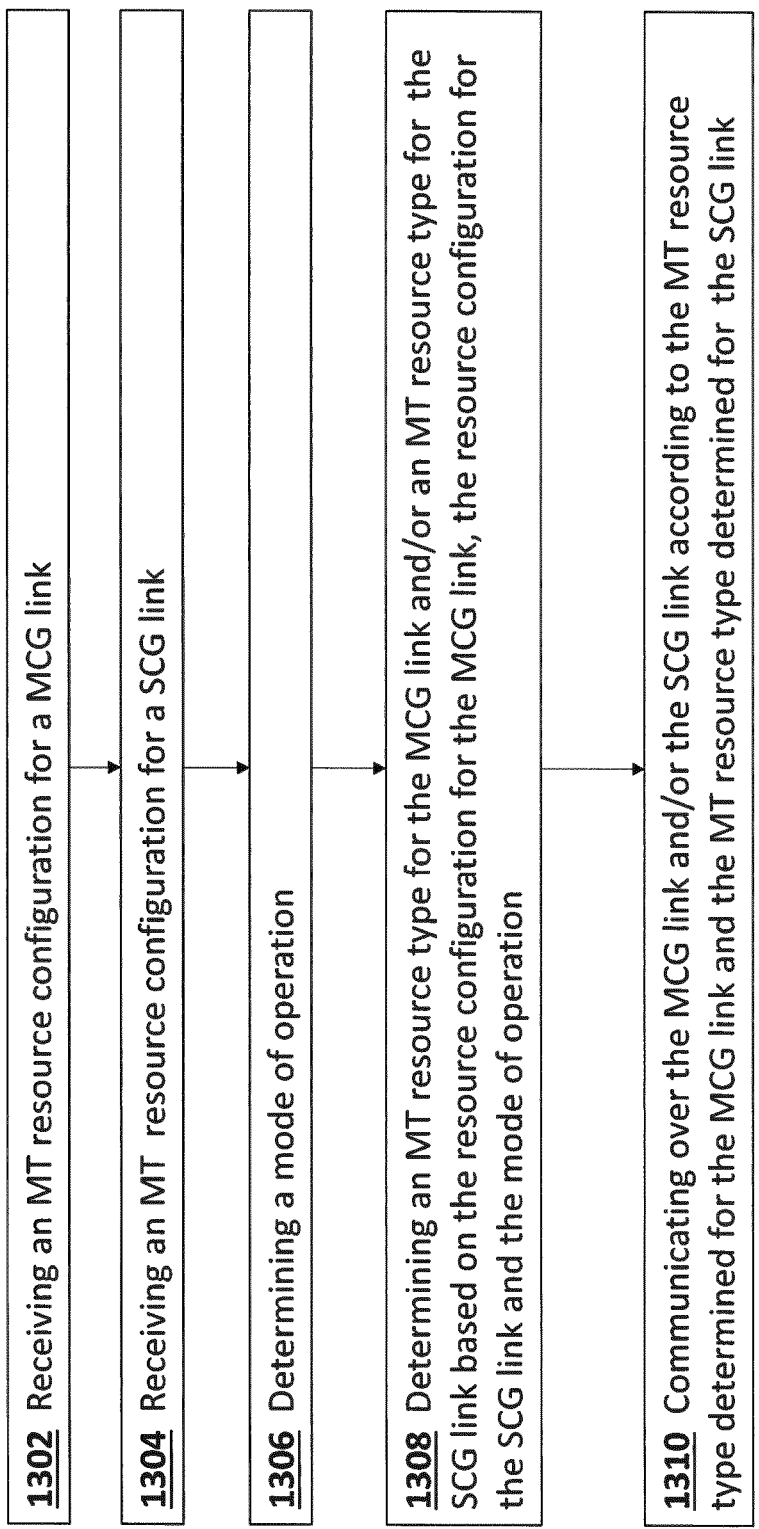
FIG. 13 shows a block diagram of a method for communicating over a master cell group link and a secondary cell group link in a dual connectivity scenario.

FIG. 13 shows a block diagram of a method for communicating over a master cell group link and a secondary cell group link in a dual connectivity scenario. The method may be performed by an IAB node comprising a single MT part providing dual connectivity to an MCG parent node via an MCG link and to an SCG parent node via an SCG link. It will be understood that the method may also be performed by an IAB node comprising a two MT parts providing dual connectivity to an MCG parent node via an MCG link and to an SCG parent node via an SCG link.

In step 1302 the IAB node may receive an MT resource configuration for the MCG link, for example from the MCG parent node. The MT resource configuration for the MCG link may correspond to a selected time resource. The MT resource configuration for the MCG link may be DL, UL or Flexible. The MT resource configuration for the MCG link may be a semi-static RRC configuration, for example received from the MCG IAB parent node, and/or may be dynamically adjusted, for example by the MCG IAB parent node, based on DCI 2_0. The control of semi-static or dynamic configurations may be on CU and the signalling path may go through the MCG link.

In step 1304 the IAB node may receive an MT resource configuration for the SCG link, for example from the SCG parent node. The MT resource configuration for the SCG link may correspond to the selected time resource. The MT resource configuration for the SCG link may be DL, UL or Flexible. The MT resource configuration for the SCG link may be a semi-static RRC configuration, for example received from the SCG IAB parent node, and/or may be dynamically adjusted, for example by the SCG IAB parent node, based on DCI 2_0.

The MT resource configuration for the SCG link may be the same as the MT resource configuration for the MCG link or different than the MT resource configuration for the MCG link.

In step 1306 the IAB mode may determine a mode of operation (i.e. duplexing configuration) between the MCG link and the SCG link. The mode of operation may be determined for the selected time resource. The mode of operation may be TDM, SDM or FDM. The mode of operation may be determined based on an indication received from the MCG IAB parent node, the SCG IAB parent node, a CU or other.

It will be understood that steps 1302, 1302 and 1306 may be performed in a different order.

It will also be understood that the selected time resource may comprise a single frequency resource for the MG link and the SCG link when the mode of operation is TDM or SDM or two frequency resources for the MCG link and the SCG link when the mode of operation is FDM. Furthermore, the frequency resources may be configured separately for the MCG link and the SCG link.

In step 1308 the IAB node may determine an MT resource type for the MCG link and/or an MT resource type for the SCG link based on the MT resource configuration for the MCG link, MT resource configuration for the SCG link and the mode of operation. The MT resource types may be determined for the selected time resource. The MT resource types may be available (i.e. DL, UL or Flexible) or not available. When the mode of operation is TDM, the MT resource types may be determined based on the table of FIG. 8 and/or the block diagram of FIG. 11. When the mode of operation is SDM or FDM, the MT resource types may be determined based on the table of FIG. 9 or 10 and/or the block diagram of FIG. 12.

In step 1310 the IAB node may share (not mandatory) the MT resource type for the MCG link and/or the MT resource type for the SCG link respectively with the MCG parent node and/or the SCG parent node for scheduling communication over the MCG link and/or the SCG link. The IAB node may communicate over the MCG link and/or the SCG link during the selected time resource according to the MT resource type for the MCG link and the MT resource type for the second MCG link determined in step 1308.

Figure 14:
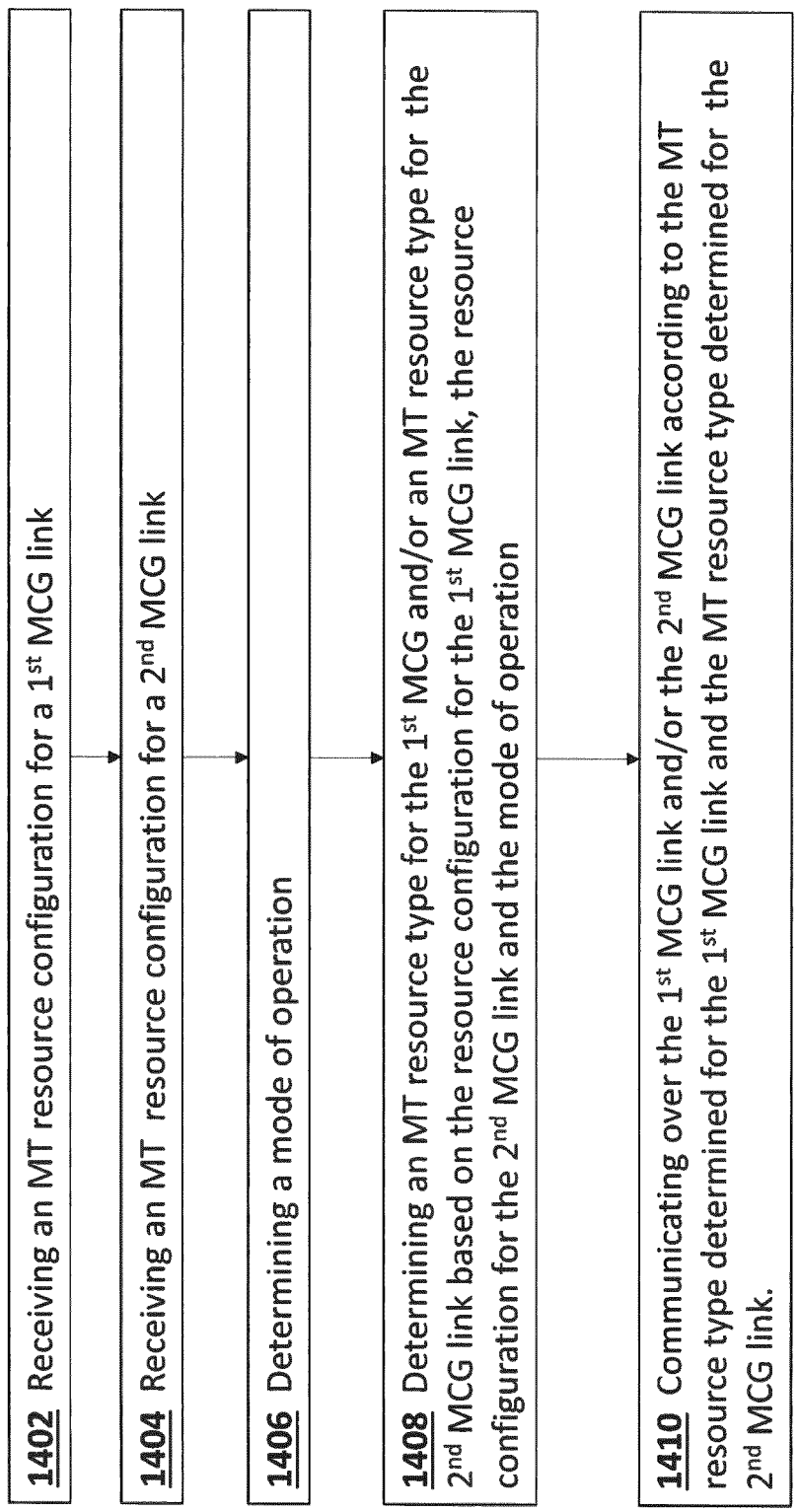
FIG. 14 shows a block diagram of a method for communicating over a master cell group link and another master cell group link in a double single connectivity scenario.

FIG. 14 shows a block diagram of a method for communicating over a master cell group link and another master cell group link in a double single connectivity scenario. The method may be performed by an IAB node comprising two MT parts, with an MT part providing single connectivity to a first MCG parent node via a first MCG link and another MT part providing single connectivity to a second MCG parent node via a second MCG link.

In step 1402 the IAB node may receive an MT resource configuration for the first MCG link, for example from the first MCG parent node. The MT resource configuration for the first MCG link may correspond to a selected time resource. The MT resource configuration for the first MCG link may be DL, UL or Flexible. The MT resource configuration for the first MCG link may be a semi-static RRC configuration, for example received from the first MCG IAB node, and/or may be dynamically adjusted, for example by the first MCG IAB parent node, based on DCI 2_0.

In step 1404 the IAB node may receive an MT resource configuration for the second MCG link, for example from the second MCG parent node. The MT resource configuration for the second MCG link may correspond to the selected time resource. The MT resource configuration for the second MCG link may be DL, UL or Flexible. The MT resource configuration for the second MCG link may be a semi-static RRC configuration, for example received from the second MCG IAB node, and/or may be dynamically adjusted, for example by the second MCG IAB parent node, based on DCI 2_0.

The MT resource configuration for the second MCG link may be the same as the MT resource configuration for the first MCG link or different than the MT resource configuration for the first MCG link.

In step 1406 the IAB mode may determine a mode of operation (i.e. duplexing configuration) between the first MCG link and the second MCG link. The mode of operation may be determined for the selected time resource. The mode of operation may be TDM, SDM or FDM. The mode of operation may be determined based on an indication received from the first MCG IAB parent node, the second MCG IAB parent node, a CU or other.

It will be understood that steps 1402, 1402 and 1406 may be performed in a different order.

It will be understood that the selected time resource may comprises a single frequency resource for the first MCG link and the second MCG link when the mode of operation is TDM or SDM or two frequency resources for the first MCG link and the second MCG link when the mode of operation is FDM. Furthermore, the frequency resource may be configured separately for the MCG link and the SCG link.

In step 1408 the IAB may determine an MT resource type for the first MCG link and/or an MT resource type for the second MCG link based on the MT resource configuration for the first MCG link, MT resource configuration for the second MCG link and the mode of operation. The MT resource types may be determined for the selected time resource. The MT resource types may be available (i.e. DL, UL or Flexible) or not available. When the mode of operation is TDM, the MT resource types may be determined based on the table of FIG. 8 and/or the block diagram of FIG. 11.

When the mode of operation is SDM or FDM, the MT resource types may be determined based on the table of FIG. 9 or 10 and/or the block diagram of FIG. 12.

In step 1410 the IAB may share the MT resource type for the first MCG link and/or the MT resource type for the second MCG link respectively with the first MCG parent node and/or the second MCG parent node for scheduling communication over the first MCG link and/or the second MCG link. The IAB node may communicate over the first MCG link and/or the second MCG link during the selected time resource according to the MT resource type for the first MCG link and the MT resource type for the second MCG link.

Figure 15:
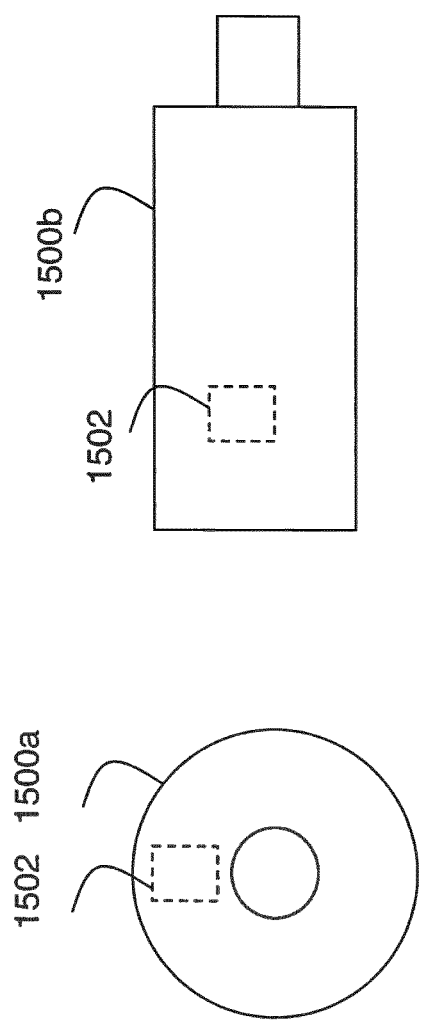
FIG. 15 shows a schematic representation of a non-volatile memory medium storing instructions which when executed by a processor allow a processor to implement one or more of the aspects of any of FIGS. 1 and 14.

FIG. 15 shows a schematic representation of non-volatile memory media 1500a (e.g. computer disc (CD) or digital versatile disc (DVD)) and 1500b (e.g. universal serial bus (USB) memory stick) storing instructions and/or parameters 1502 which when executed by a processor allow the processor to implement one or more of the aspects of FIGS. 1 to 14.

It will be understood that one or more of the above aspect may provide some or all of the following advantages: Support any number of SCG IAB nodes (i.e. scalability); Support both scenarios: MCG link and SCG link have the same or different number of hops;

Small amount of signalling needed; Support dynamic adjustment of resources available for MCG link and/or SCG link;

Support hybrid operation of TDM, FDM and/or SDM between the MCG link and/or the SCG link using the same resource configuration framework;

Supports both TOM and FDM or SDM between Parent BH link and Child access links; and May not require coordination between MCG link and SCG link.

It is noted that while the above describes example embodiments, there are several variations and modifications which may be made to the disclosed solution without departing from the scope of the present invention.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIGS. 11 to 13, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:
(a) hardware-only circuit implementations (such as implementations in only analogue and/or digital circuitry);
(b) combinations of hardware circuits and software, such as:
(i) a combination of analogue and/or digital hardware circuit(s) with software/firmware and
(ii) any portions of hardware processor(s) with software (including digital signal processor(s)), software, and memory(ies) that work together to cause an apparatus, such as the communications device or base station to perform the various functions previously described; and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus comprising:
at least one processor; and
at least one memory including computer program code;
the at least one memory and the computer program code configured to, with the at least one processor, cause the apparatus at least to:
receive a resource configuration for a first cell group link;
receive a resource configuration for a second cell group link;
determine a mode of operation, wherein the mode of operation is one of time division duplexing, spatial division duplexing or frequency division duplexing between the first cell group link and the second cell group link;
determine a resource type for the first cell group link or the second cell group link based on the resource configuration for the first cell group link, the resource configuration for the second cell group link and the mode of operation;
determine that the resource configuration for the first cell group link and the resource configuration for the second cell group link form a predefined combination, wherein the predefined combination is one of:
the resource configuration for the first cell group link is 'downlink' and the resource configuration for the second cell group link is 'flexible'; or
the resource configuration for the first cell group link is 'uplink' and the resource configuration for the second cell group link is 'flexible'; and
determine that the resource type for the first cell group link is 'downlink', 'uplink' or 'flexible' and the resource type for the second cell group link is 'not available'.

2. The apparatus of claim 1, wherein the at least one memory and the computer program code configured to, with the at least one processor, cause the apparatus at least to:

determine a resource type for the first cell group link and a resource type for the second cell group link based on the resource configuration for the first cell group link, the resource configuration for the second cell group link and the mode of operation.

3. The apparatus of claim 1, wherein the resource is a time domain resource.

4. The apparatus of claim 1, wherein the resource configuration for the first cell group link indicates a resource type.

5. The apparatus of claim 1, wherein the resource configuration for the second cell group link indicates a resource type.

6. The apparatus of claim 1, wherein the resource type for the first cell group link or the second cell group link is one of: 'downlink', 'uplink', 'flexible' or 'not available'.

7. The apparatus of claim 1, wherein the at least one memory and the computer program code configured to, with the at least one processor, cause the apparatus at least to:
determine that the resource configuration for the first cell group link and the resource configuration for the second cell group link form a predefined combination; and
determine that the resource type for the first cell group link is 'not available' and the resource type for the second cell group link is 'downlink', 'uplink' or 'flexible'.

8. The apparatus of claim 7, wherein the predefined combination is one of:
the resource configuration for the first cell group link is 'flexible' and the resource configuration for the second cell group link is 'downlink; or
the resource configuration for the first cell group link is 'flexible' and the resource configuration for the second cell group link is 'uplink'.

9. The apparatus of claim 7, wherein the resource type for the second cell group link is 'downlink' or 'uplink' based on the resource configuration of the second cell group link.

10. The apparatus of claim 1, wherein the mode of operation is spatial division duplexing or frequency division duplexing between the first cell group link and the second cell group link.

11. The apparatus of claim 10, wherein the at least one memory and the computer program code configured to, with the at least one processor, cause the apparatus at least to:
determine that the resource configuration for the first cell group link and the resource configuration for the second cell group link form a predefined combination; and
determine that the resource type for the first cell group link is 'downlink', 'uplink' or 'flexible' and the resource type for the second cell group link is 'available'.

12. The apparatus of claim 1, wherein at least one of the resource configuration for the first cell group link and the resource configuration for the second cell group link is a semi-static configuration.

13. The apparatus of claim 1, wherein one of the resource configuration for the first cell group link and the resource configuration for the second cell group link is a semi-static configuration and the other one of the resource configuration for the first cell group link and the resource configuration for the second cell group link is a dynamic configuration.

14. The apparatus of claim 1, wherein the apparatus is an integrated access and backhaul node.

15. The apparatus of claim 14, wherein the mode of operation is determined based on an indication received from an integrated access and backhaul parent node or a centralized unit.

16. A method comprising:
receive a resource configuration for a first cell group link;
receive a resource configuration for a second cell group link;
determine a mode of operation, wherein the mode of operation is one of time division duplexing, spatial division duplexing or frequency division duplexing between the first cell group link and the second cell group link;
determine a resource type for the first cell group link or the second cell group link based on the resource configuration for the first cell group link, the resource configuration for the second cell group link and the mode of operation;
determine that the resource configuration for the first cell group link and the resource configuration for the second cell group link form a predefined combination, wherein the predefined combination is one of:
the resource configuration for the first cell group link is 'downlink' and the resource configuration for the second cell group link is 'flexible': or
the resource configuration for the first cell group link is 'uplink' and the resource configuration for the second cell group link is 'flexible'; and
determine that the resource type for the first cell group link is 'downlink', 'uplink' or 'flexible' and the resource type for the second cell group link is 'not available'.

17. A non-transitory, computer readable medium comprising program instructions stored thereon, for performing at least the steps to:
receive a resource configuration for a first cell group link;
receive a resource configuration for a second cell group link;
determine a mode of operation, wherein the mode of operation is one of time division duplexing, spatial division duplexing or frequency division duplexing between the first cell group link and the second cell group link;
determine a resource type for the first cell group link or the second cell group link based on the resource configuration for the first cell group link, the resource configuration for the second cell group link and the mode of operation;
determine that the resource configuration for the first cell group link and the resource configuration for the second cell group link form a predefined combination, wherein the predefined combination is one of:
the resource configuration for the first cell group link is 'downlink' and the resource configuration for the second cell group link is 'flexible': or
the resource configuration for the first cell group link is 'uplink' and the resource configuration for the second cell group link is 'flexible'; and
determine that the resource type for the first cell group link is 'downlink', 'uplink' or 'flexible' and the resource type for the second cell group link is 'not available'.

* * * * *